(12) United States Patent
Sanders

(10) Patent No.: US 8,946,548 B2
(45) Date of Patent: *Feb. 3, 2015

(54) NAUTILUS SELF PRESSURIZING EQUIPMENT ENCLOSURE SYSTEM, APPARATUS AND METHODS

(76) Inventor: Dean Sanders, Linden, CA (US)

(*) Notice: Subject to any disclaimer, the term of this patent is extended or adjusted under 35 U.S.C. 154(b) by 688 days.

This patent is subject to a terminal disclaimer.

(21) Appl. No.: 13/050,835

(22) Filed: Mar. 17, 2011

(65) Prior Publication Data

US 2011/0164373 A1 Jul. 7, 2011

Related U.S. Application Data

(63) Continuation-in-part of application No. 11/347,034, filed on Feb. 4, 2006, now Pat. No. 7,932,466.

(51) Int. Cl.
*H05K 3/16* (2006.01)
*H02G 3/08* (2006.01)

(52) U.S. Cl.
CPC .................................... *H02G 3/088* (2013.01)
USPC ....... 174/17 GF; 174/564; 174/537; 174/539; 277/336; 361/604

(58) Field of Classification Search
USPC ....... 174/17 GF, 17.06, 17.05, 540, 539, 537, 174/536, 535, 522, 520, 50.51, 542, 564; 361/604, 612, 618, 657, 658, 666, 667, 361/691, 692; 220/694; 277/336
See application file for complete search history.

(56) References Cited

U.S. PATENT DOCUMENTS

| | | | | |
|---|---|---|---|---|
| 6,075,204 A | * | 6/2000 | Celauro et al. | 174/17 GF |
| 6,572,004 B2 | * | 6/2003 | Siu | 228/110.1 |
| 6,931,339 B1 | * | 8/2005 | Olstad et al. | 702/90 |
| 7,768,413 B2 | * | 8/2010 | Kosuge et al. | 340/612 |
| 8,321,701 B2 | * | 11/2012 | Obr et al. | 713/320 |
| 2012/0097693 A1 | * | 4/2012 | Takeuchi et al. | 220/810 |

* cited by examiner

*Primary Examiner* — Lisa Lea Edmonds
*Assistant Examiner* — Christopher L Augustin
(74) *Attorney, Agent, or Firm* — Matlock Law Group; Michael W. Caldwell

(57) ABSTRACT

The present invention relates to prohibiting water ingress in enclosures designed to protect electronics or other stored objects from damage that would occur if the protected stored objects were submerged in water or other liquids. More particularly the present invention, a water ingress prevention enclosure eliminates the need for watertight doors and other sealing gaskets by utilizing an opening in the lowest portion of the enclosure to allow rising water to pressurize the ambient gas trapped in the enclosure thus forming a pressurized chamber to which liquid cannot rise. Embodiments of the invention include a system, apparatus, method and computer implemented code to enable monitoring and storage of one or more stored objects in a liquid-free environment.

27 Claims, 18 Drawing Sheets

Exemplary
Computer System

NAUTILUS SELF PRESSURIZING EQUIPMENT ENCLOSURE SYSTEM, APPARATUS AND METHODS

CROSS REFERENCES TO RELATED APPLICATIONS

This application is a continuation in part of U.S. patent application Ser. No. 11/347,034, "NAUTILUS SELF PRESSURIZING EQUIPMENT ENCLOSURE," filed Feb. 4, 2006 now U.S. Pat. No. 7,932,466, which is hereby incorporated entirely herein by reference.

FIELD OF THE DISCLOSURE

The subject matter herein relates generally to a system and method for prohibiting water ingress in enclosures designed to protect electronic components or other stored objects from damages that would occur if the protected objects were submerged in water or other liquids while allowing easy service access to the electronic components or other stored objects housed therein. More particularly the present invention, a water ingress prevention enclosure, eliminates the need for watertight doors and sealing gaskets by utilizing an opening in the lowest portion of the enclosure to allow rising water to pressurize the gas trapped in the enclosure thus forming a pressurized chamber to which water cannot rise.

BACKGROUND

The science of pressurized vessels is well known, and was originally postulated by Blaise Pascal (1623-1662 AD) as pressure being the equivalent of density times gravity times height of fluid or gas (P=pgh). One type of protective pressurized device is a "diving bell" where the gas inside the diving bell is pressurized as the bell is lowered into the water. The water ingresses the bell until equal pressure exist on the captured gas and the ingress water. The current invention is capable of protecting electronic or electrical equipment, or other non-electrical equipment or components from water ingress when water is less than one and one half atmosphere of pressure (one square inch pressurized to 22 pounds force) or fifteen (15) feet of water over the bottom of the enclosure or "bell" opening.

Watertight enclosures are required when deploying electronic equipment in places that may be flooded under water. Permanently sealed enclosures have the advantage of having the best water resistancy; however, access to inside the enclosure is difficult when the enclosure is permanently sealed. When a water resistant enclosure is not permanently sealed, i.e. when the enclosure has an opening for access to the stored object of the enclosure, the opening must have a cover. The cover must form a water-tight seal on the opening. A watertight seal is possible by direct contact between the opening and the cover when the opening is small. However, when the enclosure and its opening are large, such as in the cases of underground electrical connection boxes and underground utility equipment vaults, which usually are steel boxes, a tight seal between the opening and the cover requires the use of a water-tight gasket. A gasket is usually made of a resilient material such as rubber that is subject to degradation. When the gasket degrades, or if the door is deformed or jammed, the seal is no longer water-tight, subjecting the stored object of the enclosure to water damage.

SUMMARY OF THE INVENTION

Accordingly, it is a primary object of the invention to provide a enclosure that will prevent electronic and electrical equipment and other stored objects from being damaged by water when placed in locations below ground level surface grade where the maximum height of water is fifteen (fifteen) feet over the bottom bell opening of enclosure apparatus, and that said water damage prevention shall not rely on gaskets of other mechanical means. The maximum height of fifteen feet of water over the bottom of the bell enclosure may be measured without regard to distance from surface grade allowing the enclosure apparatus to be utilized in a plurality of industrial and environmental applications It is a further object of the invention to provide an enclosure apparatus that will prevent electronic and electrical equipment and other stored objects from being damaged by water when placed in locations where water may inundate the enclosure apparatus to a the maximum height of fifteen (fifteen) feet over the bottom opening of the enclosure apparatus, that said enclosure apparatus has a large opening for easy access to the equipment by service personnel, and that said water damage prevention does not rely on gaskets or other mechanical means. The maximum height of fifteen feet of water over the bottom of the enclosure may be measured without regard to distance from ground level, allowing the enclosure apparatus to be utilized in a plurality of industrial and environmental applications.

It is yet another object of this invention to provide a means to allow the protected equipment to be withdrawn via guides and bracketry through the open bottom of the enclosure in order for the electronic or electric components or other stored objects to be serviced.

It is yet another object of this disclosure to provide a means to allow for the protected equipment to be lockable, latchable or otherwise held in place within the enclosure and provide ingress for electrical conduits.

To attain these objects, a new waterproof enclosure is invented that does not rely on mechanical gaskets to restrain water ingress, but rather utilizes understood physical phenomenon to prohibit water ingress into the enclosure. An apparatus according to this disclosure is ideally suited for installation in locations where temporary, low pressure water submersion of the enclosure is limited to a depth of fifteen feet, as required for underground electrical connection boxes, underground utility equipment vaults, and subterrain structures where storm water, rain and floods are possible.

In one embodiment of the NautilUs Self Pressurizing Equipment Enclosure, a gasketless, one and one-half atmospheres of pressure waterproof enclosure assembly comprises a five-sided open bottom air tight enclosure which utilizes known fluid and pressure dynamics formulas to allow liquids to rise within the enclosure thereby pressurizing the atmospheric gas contained therein to a pressure equal to the rising liquid pressure; thus, preventing exposure to said electronic or electrical equipment or other stored objects contained within the pressurized gas area within the enclosure to a further height than the opening access cavity for a pressure differential prevention of water ingress and a gasketless enclosure attached thereto.

In another embodiment, a gasketless waterproof enclosure apparatus comprises a gasketless open bottom airtight enclosure. When the apparatus is submerged in water, water ingresses the lower portion of the enclosure that is used as a pressure differential cavity. The water ingress and the trapped air forms an interface the same size as an inner diameter of the open bottom air tight enclosure, thereby preventing fluid ingress into a pressurized gas area and preventing air loss from the bottom of said pressurized gas area. Because the enclosure is airtight, the trapped air is compressed and pushes water down inside the enclosure. When the pressure of water pushing in reaches equilibrium with the air pressure pushing down, further water ingress into the enclosure is prevented, and the equipment placed at an upper portion of the enclosure is protected from water damage. An embodiment of the waterproof enclosure is designed to withstand water pressure of one and one-half (1.5) atmosphere pressure ("ATM"), which is approximately the pressure from fifteen feet high of water. The pressurized gas area comprises an interior of the open bottom air tight enclosure wherein equipment may be placed, wherein said open bottom air tight enclosure allows liquid to push upward in said gasketless enclosure to a level wherein a total volume contained within said open bottom air tight enclosure comprises a volume of liquid below the gasketless enclosure plus a volume of gas inside the pressurized gas area, wherein an internal pressure of gas equals up to one and one-half (1.5) ATM and wherein an arrangement of equipment components are located within the pressurized gas area within the enclosure at a further height than an opening access cavity to create a pressure differential. Said pressure differential comprises a difference of up to fifteen feet of water over the bottom of an enclosure opening such that said pressure differential causes said liquid to push upwards within the open bottom air tight enclosure until the pressure of gas inside the pressurized gas area equals one and one half atmospheres.

In another aspect of the embodiment, the gasketless waterproof enclosure apparatus may further include a guide and bracketry inner chassis providing a means for withdrawing protected equipment through an opening at the bottom of the enclosure apparatus, a rail sleeve telescoping guide assembly, and a tray panel that is slidingly coupled to the rail sleeve telescoping guide assembly, an open bottom pressure differential cavity, and a skirt coupled to the gasketless enclosure.

In yet another aspect of the embodiment, the gasketless waterproof enclosure apparatus may further include a submersible chassis assembly that includes a guide and bracketry inner chassis portion, a rail sleeve telescoping guide assembly, and a tray panel that is slidingly coupled to the rail sleeve telescoping guide assembly, an open bottom pressure differential cavity, and a skirt coupled to the gasketless enclosure. When the gasketless waterproof enclosure apparatus is submerged underwater, water enters the lower portion of the enclosure creating a gasketless water seal. The equipment or other stored objects are protected up to a maximum water column height of fifteen feet over the bottom of the open enclosure bottom. At the designed maximum water column height, a pressure differential causes liquid to push upwards within the open bottom air tight enclosure until the pressure of gas inside the pressurized gas area equals one and one half atmospheres.

In another embodiment, a NautilUs Self Pressurizing Equipment Enclosure, a gasketless, one and one-half atmospheres of pressure waterproof enclosure apparatus comprises a five-sided open bottom air tight enclosure which utilizes known fluid and pressure dynamics formulas to allow liquid to rise within the enclosure thereby pressurizing the atmospheric gas contained therein to a pressure equal to the rising liquid pressure, thus preventing exposure to the equipment or other stored objects contained within the pressurized gas area within the enclosure to a further height than the opening access cavity for a pressure differential prevention of water ingress and a gasketless enclosure attached thereto.

In another embodiment, the NautilUs Self Pressurizing Equipment Enclosure further comprises a concealed locking or latching entry feature, a guide and bracketry inner chassis, rail sleeve telescoping guide assembly, component mounting rear tray panel slidingly coupled thereto, and an open bottom pressure differential cavity and skirt coupled therein.

In another embodiment, the NautilUs Self Pressurizing Equipment Enclosure further comprises a submersible telemetry, control, telecommunications or electronics assembly wherein a concealed locking or latching entry feature, a guide and bracketry inner chassis, rail sleeve telescoping guide assembly, component mounting rear tray panel slidingly coupled thereto, and an open bottom pressure differential cavity and skirt coupled therein for use with telecommunications, utility, energy, electrical and electronics power or control applications.

In yet another embodiment, the NautilUs Self Pressurizing Equipment Enclosure wherein the five-sided open bottom air tight cavity comprises a liquid volume fluidly coupled to a gas volume creating a gas-fluid coupling layer, said gas-fluid coupling layer interface rising in elevation within said cavity thereby changing cavity pressure equal to the rising liquid pressure to a maximum design pressure of 1.5 atmospheres, thereby preventing exposure to said enclosure to a maximum design depth of 15 feet of water or equivalent to a column height of 15 feet of water over the bottom of the enclosure bell bottom, independent of the enclosure's distance below surface grade.

In another embodiment, a guide and bracketry inner chassis comprises guides and bracketry allowing the protected equipment to be withdrawn via and through the open bottom of the enclosure in order for the protected equipment to be serviced, a telescoping rail and guide rack assembly, and a five sided tray panel.

In another embodiment of the NautilUs Self Pressurizing Equipment Enclosure, the guides and bracketry include sleeve and telescoping features to facilitate full height 150% extension utilizing a rack and rail system with nested guides in fully retracted position. The guides and braketry are strong enough to allow the protected equipment mounted to the tray panel to extend to 150% of the length of the tray panel.

In yet another embodiment, the NautilUs Self Pressurizing Equipment Enclosure comprises a concealed locking or latching entry feature allowing the protected equipment to be secured in place where access is gained through the open bottom of the enclosure.

In another embodiment, the NautilUs Self Pressurizing Equipment Enclosure comprises a means for counterbalancing weight distribution allowing the protected equipment and submersible enclosure to be of lesser weight while still providing the necessary pressure differential to seal the assembly. The means for counterbalancing weight distribution may be coupled to the rail sleeve telescoping assembly.

In another embodiment, a method for providing prevention of water ingress to an waterproof enclosure apparatus, comprises the steps of: gasketless water sealing to a depth of fifteen feet, waterproof enclosure and mounting, and protection of the stored objects from water damage.

In yet another embodiment, the NautilUs Self Pressurizing Equipment Enclosure further comprises a processor and one or more input devices coupled to the processor. One or more sensors are coupled to the processor with the one or more sensors being capable of detecting one or more user-defined parameters and generating one or more signals in response to the presence of the one or more user-defined parameters. A memory is also coupled to the processor. The embodiment further comprises one or more wireless communications means, one or more output devices and an execution engine including a method for monitoring the status of one or more stored objects in a gasketless waterproof enclosure apparatus.

In another embodiment, a waterproof enclosure apparatus is adapted to be installed in a substantially upright position. The apparatus comprises: a waterproof enclosure that is gas tight at its side and top and has one of more openings at its bottom when the waterproof enclosure apparatus stands upright; and a holding device for placing stored object of the waterproof enclosure apparatus to an upper portion inside the waterproof enclosure. The lower portion of the waterproof enclosure apparatus is designed to be used as a pressure differential cavity. The height of the waterproof enclosure may be designed to be longer than the widest width of the waterproof enclosure. It is within the scope of this invention that stored object encompasses any item, electronic or otherwise that one or more users wish to store in a liquid-free environment within the enclosure. One of ordinary skill in the art will appreciate that the lower portion of the waterproof enclosure apparatus being adapted to be used as a pressure differential cavity is not intended to hold stored object because water may enter and occupy this space when the waterproof enclosure apparatus is submerged under water.

In another aspect of the embodiment, the holding device for placing stored object of the enclosure to an upper portion inside said waterproof enclosure comprises a guide and bracketry inner chassis, a rail sleeve telescoping guide assembly, and a tray panel that is slidingly coupled to the rail sleeve telescoping guide assembly. In another aspect of the embodiment, the guide and bracketry inner chassis may include sleeve and telescoping features to facilitate full height 150% extension thereby utilizing a rack and rail assembly with nested guides in a fully retracted position. In yet another aspect of the embodiment, the waterproof enclosure apparatus may further include a device to counterbalance weight distribution of the fully retracted enclosure allowing the protected equipment and submersible enclosure to be of lesser weight than the same enclosure with gaskets while still providing the necessary pressure differential to seal the apparatus. The device for counterbalancing weight distribution may be coupled to the rail sleeve telescoping guide assembly.

In yet another aspect of the embodiment, the holding device for placing stored object of the enclosure to an upper portion inside the waterproof enclosure comprises a submersible chassis assembly comprising a guide and bracketry inner chassis portion, a rail sleeve telescoping guide assembly; and a tray panel that is slidingly coupled to the rail sleeve telescoping guide assembly.

In yet another embodiment a waterproof enclosure further comprises a processor; one or more input devices coupled to said processor; one or more sensors coupled to said processor, the one or more sensors being capable of detecting one or more user-defined parameters and generating one or more signals in response to the presence of the one or more user-defined parameters; a memory coupled to said processor; one or more wireless communications means; and one or more output devices; and an execution engine including a method for monitoring the status of one or more stored objects in a gasketless waterproof enclosure apparatus.

In an embodiment a waterproof enclosure apparatus further comprises one or more covers that cover said opening at the bottom of said waterproof enclosure apparatus. It is within the scope of the invention that the cover can be hinged, a sliding door, a secured with bolting or fastening means common in the art or snapped on.

In yet another embodiment, the waterproof enclosure apparatus may further include means for installing said waterproof enclosure apparatus to its intended installation site. One of ordinary skill in the art will realize that these means can include handles, rails on the outside of the enclosure or other placement and/or gripping means understood by one of ordinary skill in the art.

In another aspect of the embodiment, the waterproof enclosure apparatus comprises one or more sensors capable of detecting one or more parameters and generating one or more signals corresponding to the parameters; and one or more electronic circuitry capable of transmitting the signals to a remote location. The parameters may be user defined and may be communicated by telemetry circuits and sensors. Communication, as explained in the Exemplary operating environments, may occur via a server through LAN or WAN, or to a dedicated device. Examples of dedicated devices contemplated by this invention are weather stations or other receiving means that may communicate temperature, humidity, liquid level, and conditions of one or more stored objects placed therein.

In another embodiment, a waterproof enclosure apparatus adapted to be installed in a substantially upright position comprises an outer waterproof enclosure, wherein said outer waterproof enclosure being gas tight at its side and top and having opening at its bottom when said waterproof enclosure apparatus stands upright; an inner waterproof enclosure, wherein said inner waterproof enclosure being gas tight at its side and bottom and having opening at its top when said waterproof enclosure apparatus stands upright; and wherein through attachment means, said inner waterproof enclosure being attached inside said outer waterproof enclosure, said opening of the inner enclosure being close to the top of the outer enclosure; and a means for holding stored object of the waterproof enclosure apparatus inside said inner waterproof enclosure. The pressure differential cavity is of sufficient size so that the apparatus can withstand a designed water pressure and prevent water from entering into the inner enclosure that contains one or more stored objects therein. The inner enclosure in certain embodiments may occupy over half of the space within the outer enclosure and may be adapted in size to adapt to different needs dictated by differing environmental factors.

In another embodiment, a gasketless waterproof enclosure apparatus comprises an open bottom enclosure comprising a sealed top portion, sides defined by one side wall being in a substantially rectangular shape, and an open bottom portion, wherein a first inner volume is defined by the volume formed by an inner portion of said open bottom enclosure; a skirt coupled to the bottom portion of said open bottom enclosure, thereby forming a second inner volume, the second inner volume being less than the first inner volume; wherein said skirt is of a length sufficient to maintain a water proof environment inside first inner volume up to 1.5 atmospheres of pressure, therefore forming an airtight open bottom enclosure with a gasketless water seal; wherein said open bottom enclosure protects one or more stored objects located inside the first inner volume and wherein upon submersion of the open bottom enclosure into a liquid the liquid rises upward within said second inner volume but does not rise upward into said first inner volume, wherein said liquid rising upward pressurizes gases located in said first inner volume to a maximum pressure of one and one half atmospheres (1.5 atm), the final pressure of the gases located in said first inner volume being equal to the pressure of liquid pushing upward on said gases, thereby achieving a state of equilibrium; and wherein said state of equilibrium provides a gasketless water seal such that one or more stored objects located in said inner volume remain free from unwanted exposure to a liquid. The composition of the liquid that the apparatus is immersed in may vary based on environmental factors. For example, certain environments may have a very alkaline or acidic liquid environment. Other environments may have liquid that are corrosive or otherwise damaging. It is within the scope of this invention that different materials may be used to construct the enclosure such that it may be adapted to be used in differing and potentially harsh liquid environments.

In yet another embodiment a gasketless waterproof enclosure apparatus of comprises a guide and bracketry inner chassis coupled to the inner portion of said open bottom enclosure and wherein the guide and bracketry inner chassis provides a means for withdrawing protected equipment through an open bottom of said open bottom air tight enclosure; a rail sleeve telescoping guide assembly coupled to said guide and bracketry inner chassis; a tray panel that is slidingly coupled to the rail sleeve telescoping guide assembly; and an open bottom pressure differential cavity comprising second inner volume formed by said skirt.

In another aspect of the embodiment, the gasketless waterproof enclosure apparatus further comprises a submersible chassis assembly including a guide and bracketry inner chassis portion, a rail sleeve telescoping guide assembly; a tray panel that is slidingly coupled to the rail sleeve telescoping guide assembly; an open bottom pressure differential cavity; wherein a gasketless water seal protects the stored objects up to a maximum water column height of fifteen feet over the bottom of the open enclosure bottom; and wherein said maximum water column height creates a pressure differential that causes liquid to push upwards within the open bottom air tight enclosure until the pressure of gas inside the pressurized gas area equals one and one half atmospheres.

In another aspect of the embodiment of the gasketless waterproof enclosure apparatus, the open bottom enclosure is comprised of material selected from the group consisting of metal, aluminum, fiberglass, metal composite, plastic, and plastic composite. It is within the scope of this invention that any of the above materials or derivatives thereof suitable to withstand a desired pressure is contemplated.

In another embodiment, a gasketless waterproof enclosure apparatus comprises an open bottom enclosure including a sealed top portion, sides defined by one side wall being in a substantially rectangular shape, and an open bottom portion, wherein a first inner volume is defined by a volume formed by an inner portion of said open bottom enclosure; a skirt coupled to the bottom portion of said open bottom enclosure, thereby forming a second inner volume, the second inner volume being less than the first inner volume; one or more mounting means coupled to said inner portion of the open bottom enclosure, wherein one or more stored objects can be mechanically coupled to the one or more mounting means; one or more processors; one or more clocks coupled to the one or more processors; one or more computer-usable readable storage medium having computer-readable program code embodied therein, wherein the one or more computer-usable readable storage medium is coupled to the one or more processors; one or more I/O interfaces; one or more analog to digital interfaces; one or more operating system software environments; one or more wireless communication means; one or more hard-wired communication means; and wherein said open bottom enclosure protects one or more stored objects located inside the first inner volume and wherein upon submersion of the open bottom enclosure into a liquid the liquid rises upward within said second inner volume but does not rise upward into said first inner volume, wherein said liquid rising upward pressurizes gases located in said first inner volume to a maximum pressure of one and one half atmospheres (1.5 ATM), the final pressure of the gases located in said first inner volume being equal to the pressure of liquid pushing upward on said gases, thereby achieving a state of equilibrium. It is understood by one of ordinary skill that the one or more mounting means can be any commonly used or known in the art such as (but not limited to) screws, mounting racks, bolts, glue, tape or other suitable mounting means.

In another aspect of the embodiment of the gasketless waterproof enclosure apparatus, the skirt is of a length sufficient to maintain a water proof environment inside first inner volume up to 1.5 atmospheres of pressure, therefore forming an air tight open bottom enclosure with a gasketless water seal.

In another embodiment, a system to provide a computer implemented method for monitoring the status of one or more stored objects in a gasketless waterproof enclosure apparatus including computer-usable readable storage medium having computer-readable program code embodied therein for causing a computer system to perform a method of monitoring the status of one or more stored objects in an gasketless waterproof enclosure apparatus in an application platform comprises: one or more processors; a clock; memory; one or more I/O interfaces; one or more analog to digital interfaces; operating system software; an open bottom enclosure comprising a sealed top portion, sides defined by one side wall being in a substantially rectangular shape, and an open bottom portion, wherein a first inner volume is defined by the volume formed by an inner portion of said open bottom enclosure; a skirt coupled to the bottom portion of said open bottom enclosure, thereby forming a second inner volume, the second inner volume being less than the first inner volume; one or more mounting means coupled to said inner portion of the open bottom enclosure, wherein one or more stored objects can be mechanically coupled to the one or more mounting means; and wherein said open bottom enclosure protects one or more stored objects located inside the first inner volume and wherein upon submersion of the open bottom enclosure into a liquid the liquid rises upward within said second inner volume but does not rise upward into said first inner volume, wherein said liquid rising upward pressurizes gases located in said first inner volume to a maximum pressure of one and one half atmospheres (1.5 ATM), the final pressure of the gases located in said first inner volume being equal to the pressure of liquid pushing upward on said gases, thereby achieving a state of equilibrium. In a further aspect, the skirt may be of a length sufficient to maintain a water proof environment in side first inner volume up to 1.5 atmospheres of pressure, therefore forming an air tight open bottom enclosure with a gasketless water seal.

In another embodiment, a computer implemented apparatus for providing a method for monitoring the status of one or more stored objects in a gasketless waterproof enclosure apparatus comprises: a processor; one or more input devices coupled to said processor; one or more sensors coupled to the processor, the one or more sensors being capable of detecting one or more user-defined parameters and generated one or more signals in response to the presence of the one or more user-defined parameters; a memory coupled to said processor; one or more wireless communications means; one or more output devices; and an execution engine including a method for monitoring the status of one or more stored objects in a gasketless waterproof enclosure apparatus comprising the following steps: placing one or more stored objects in an open bottom enclosure comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment in side first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means; enabling the one or more sensors coupled to the processor to monitor whether the one or more stored objects has been subjected to unwanted contact with liquid; monitoring whether the one or more stored objects has been subjected to unwanted contact with liquid with the one or more sensors; communicating with said apparatus via one or more wireless communication means to receive one or more data from the one or more sensors; interpreting the one or more data to determine if the one or more stored objects have been exposed to a liquid; communicating with one or more users at one or more user-defined intervals; and communicating with one or more users when one or more user-defined events occur.

In another embodiment, a method for monitoring the status of one or more stored objects in a gasketless waterproof enclosure apparatus comprises: providing one or more gasketless waterproof enclosures comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment in side first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means; associating one or more stored objects with one or more open bottom enclosures; providing a processor, one or more input devices coupled to said processor, one or more sensors coupled to the processor, the one or more sensors being capable of detecting one or more user-defined parameters and generated one or more signals in response to the presence of the one or more user-defined parameters, a memory coupled to said processor, one or more wireless communications means, one or more output devices, and an execution engine; installing said open bottom enclosure apparatus containing one or more associated stored objects in a user defined location, where may be flooded from time to time; enabling one or more sensors coupled to a processor to monitor whether the one or more stored objects has been subjected to unwanted exposure with liquid; communicating with one or more users at one or more user-defined intervals; and communicating with one or more users when one or more user-defined events occur.

In yet another embodiment, a computer readable medium for monitoring the status of one or more stored objects in a gasketless waterproof enclosure apparatus comprises: program code for interfacing with one or more stored objects in an open bottom enclosure comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment inside first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means; program code for associating a gasketless waterproof enclosure apparatus with one or more stored objects coupled to the inner portion of an open bottom enclosure; program code for enabling one or more sensors coupled to a processor to monitor whether the one or more stored objects has been subjected to unwanted exposure with liquid; program code for communicating with one or more users at one or more user-defined intervals; and program code for communicating with one or more users when one or more user-defined events occur.

In another embodiment, a method for preventing unwanted exposure to liquid of one or more stored objects comprises the following steps: providing one or more open bottom enclosures comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment inside first inner volume up to 1.5 atmospheres of pressure, therefore forming an airtight open bottom enclosure with a gasketless water seal and wherein one or more mounting means are coupled to said inner portion of the open bottom enclosure, wherein one or more stored objects can be mechanically coupled to the one or more mounting means; associating one or more stored objects with one or more open bottom enclosures; and installing said open bottom enclosure containing one or more associated stored objects in a user defined location. When the location is flooded or submerged under a liquid, said liquid may rise into said second inner volume compressing the air trapped inside the airtight enclosure. The pressure of the gas trapped inside rises as more liquid enters the airtight enclosure pushing air-liquid interface upward. As the pressure of the trapped gas and the pressure of the ingress liquid equilibrate, said liquid cannot rise into said first inner volume, thereby preventing one or more stored objects from receiving unwanted exposure to a liquid. The waterproof enclosure apparatus may be designed to withstand a maximum pressure of one and one half atmosphere (1.5 ATM), equivalent to the pressure from water 15 feet deep.

BRIEF DESCRIPTION OF THE DRAWING FIGURES

DETAILED DESCRIPTION

Figure 1:
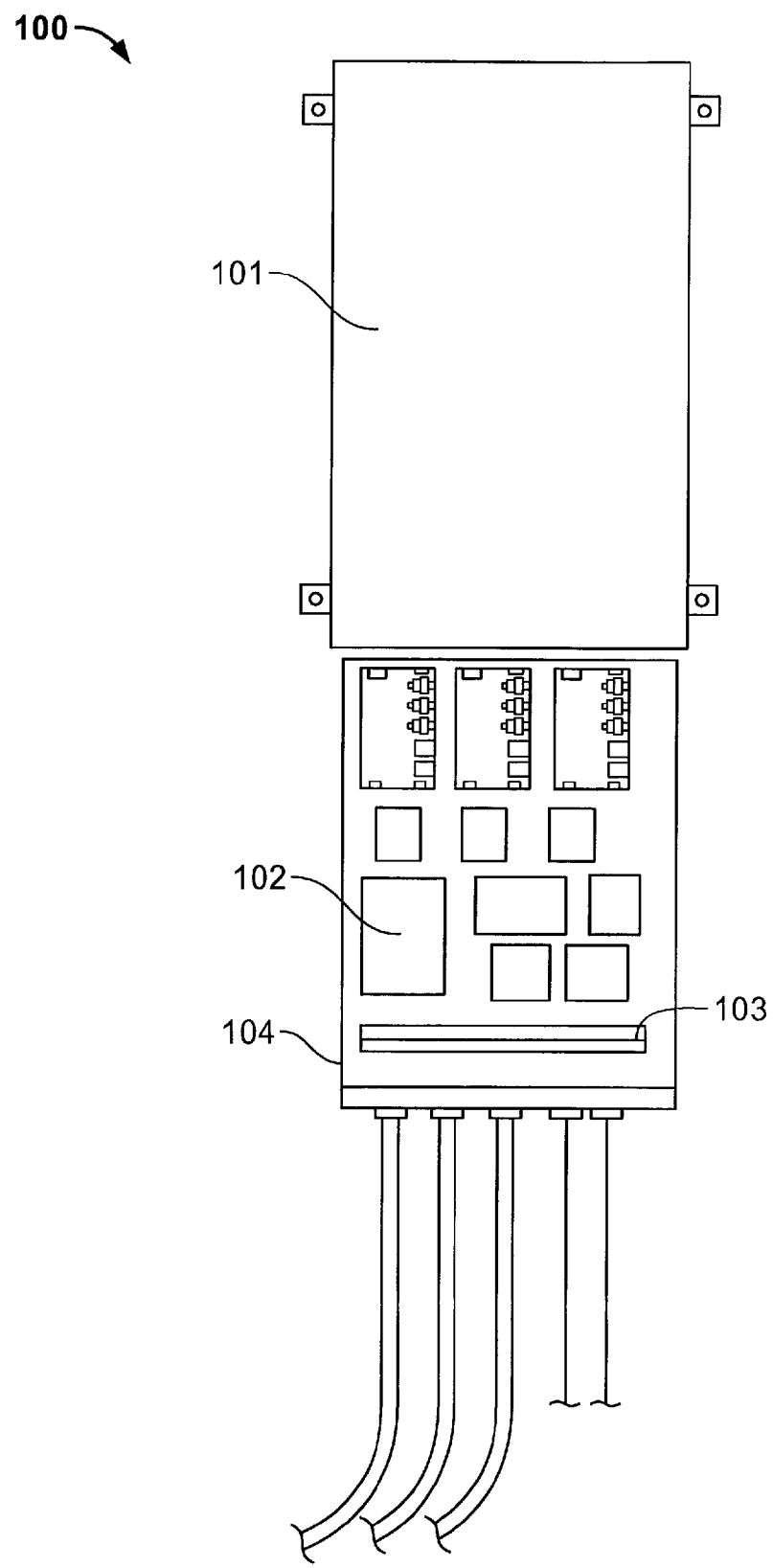
FIG. 1 is an exploded front view of an embodiment of the various stored objects and apparatus for an underground control enclosure.

Persons of ordinary skill in the art will realize that the following description is illustrative only and not in any way limiting. Other modifications and improvements will readily suggest themselves to such skilled persons having the benefit of this disclosure.

Conventional watertight enclosures rely on seals and gaskets to prevent water ingress at the opening-cover interface. The drawbacks of seals and gaskets are well known because they degrade significantly over time thus allowing ingress of water. Thus, it is a primary object of this disclosure to provide an enclosure apparatus that does not rely on gaskets or other mechanical means yet still prevents electronic, electrical, other equipment, and other stored objects from being damaged by water ingress when placed in locations that may be flooded by water up to fifteen (15) feet deep, even if the location is far below ground level. For example, the enclosure apparatus may be installed in an underground utility vault, manhole, mine or underground storage tank. Other engineering applications of distance below grade while maintaining design water column height may be readily apparent to those skilled in the art applying said equipment and enclosures in various environments. In addition, this disclosure provides a retractable positioning feature for waterproof enclosures to conveniently move stored equipment inside the enclosure.

It is yet another object of this invention to provide a means to allow the protected equipment to be withdrawn via guides and bracketry through the open bottom of the enclosure in order for the electronic or electric components and other stored objects to be serviced.

It is yet another object of this invention to provide a means to allow for the protected equipment to be lockable and provide ingress for electrical conduits.

It is yet another object of this invention to provide a counterbalancing means to reduce weight requirements necessary to lift the protected equipment into the submersible waterproof enclosure.

To attain these objects, the present discussion discloses a new gasketless waterproof enclosure apparatus that does not rely on mechanical gaskets around the enclosure perimeter to restrain water ingress, but rather utilizes understood physical phenomenon to prohibit liquid ingress into the enclosure. The novel enclosure design utilizes fluid mechanics to protect electrical and electronic equipment and other stored objects from water ingress when water pressure is less than one and one half atmosphere, the equivalent of fifteen feet of water over the bottom of the enclosure or bell opening. It is understood that individual enclosures must be designed with regards to the weight and size of the enclosed equipment to be protected. The drawbacks of seals and gaskets are well known and degrade significantly over time thus allowing ingress of water. The present invention avoids these drawbacks by utilizing an open bell enclosure bottom and further utilizing a concealed locking or latching feature allowing the protected equipment to be secured where access is gained through the open bottom of the "bell" enclosure to the protected equipment. This access is gained with the use of guides and bracketry, a telescoping rail with guide rack assembly, and a multi-sided tray panel allowing the protected equipment to be withdrawn via and through the open bottom of the "bell" enclosure in order for the electronic or electric components or other stored objects to be serviced. The bracketry and telescoping features facilitate the protected equipment multi-sided tray to extend below the "bell" enclosure, or to be fully removed from the enclosure.

The science of pressurized vessels is well known, and was originally postulated by Blaise Pascal (1623-1662 AD) as pressure being the equivalent of density times gravity times height of fluid or gas (P=pgh). One type of protective pressurized device is a "diving bell" where the gas inside the diving bell is pressurized as the bell is lowered into the water. The water ingresses the bell until equal pressure exist on the captured gas and the ingress water.

The present disclosure embodies a novel application of the diving bell's working principle to waterproof enclosures. The volume and pressure of a certain mass of air at a given temperature is calculated according to the formula $P_1*V_1=P_2*V_2$. In this case, the air trapped inside the airtight enclosure before water ingress is at one atmosphere pressure and has the volume $V_1$. Thus, $P_1=1$ ATM, and $V_1$ is the entire volume of the airtight enclosure. Under fifteen feet of water, the maximum water pressure the system is designed to withstand, the additional pressure from water is 0.5 ATM, and the total pressure $P_2=1.5$ ATM. Water ingresses into the enclosure and compresses the air trapped inside until equal pressure exists on the captured gas and the ingress water. According to the formula, assuming no air loss and no change of temperature, $V_2=P_1*V_1/P_2=V_1/1.5=0.67\ V_1$. $V_2$ is about two thirds of $V_1$, so if the enclosure is of the same size vertically, water can push up to one third (⅓) inside the airtight enclosure. The upper two thirds (⅔) of the enclosure is occupied by the trapped compressed air and is protected from the water ingress. To leave a margin of safety, the electronic equipment or other stored object is preferably placed in the upper half of the airtight enclosure to be safely protected from coming into contact with water.

The lower portion of the enclosure is designed not to hold any water sensitive equipment because water may enter the lower portion of the enclosure and pressurize the air trapped inside the enclosure. A cover or skirt may be placed at the bottom opening that allows water to flow in upward the enclosure while preventing air inside the enclosure being washed away.

According to the teaching of the invention, the gasketless waterproof enclosure provides moving mounting members inside the enclosure that mount the equipment stored therein to the upper portion of the enclosure. The moving mounting members provide secure access to the equipment by allowing the protected equipment to be released through the open bottom of the enclosure. To prevent unauthorized access to the equipment in the enclosure, a padlocking feature may be employed to lock the moving mounting members. Alternatively, a door may be installed at the bottom opening, and the door may be locked to prevent unauthorized access. The door may also help keep out grass growth and pests.

In one embodiment, the moving mounting members include guides and bracketry, a telescoping rail with guide rack assembly, and a multi-sided tray panel allowing the protected equipment to be withdrawn via and through the open bottom of the enclosure in order for the electronic or electric components or other stored object to be serviced. The bracketry and telescoping features facilitate the protected equipment multi-sided tray to extend below the enclosure, or to be fully removed from the enclosure.

FIG. 1 is an exploded front view 100 of the various components and assembly for an underground control enclosure.

FIG. 1 is an open front view of the retractable positioning system showing the waterproof enclosure apparatus 101 with typical electronic equipment 102 that would be protected from water breaching the enclosure, included is the counterbalancing means 103 to offset the weight of the electronics tray 104 and equipment.

Figure 2:
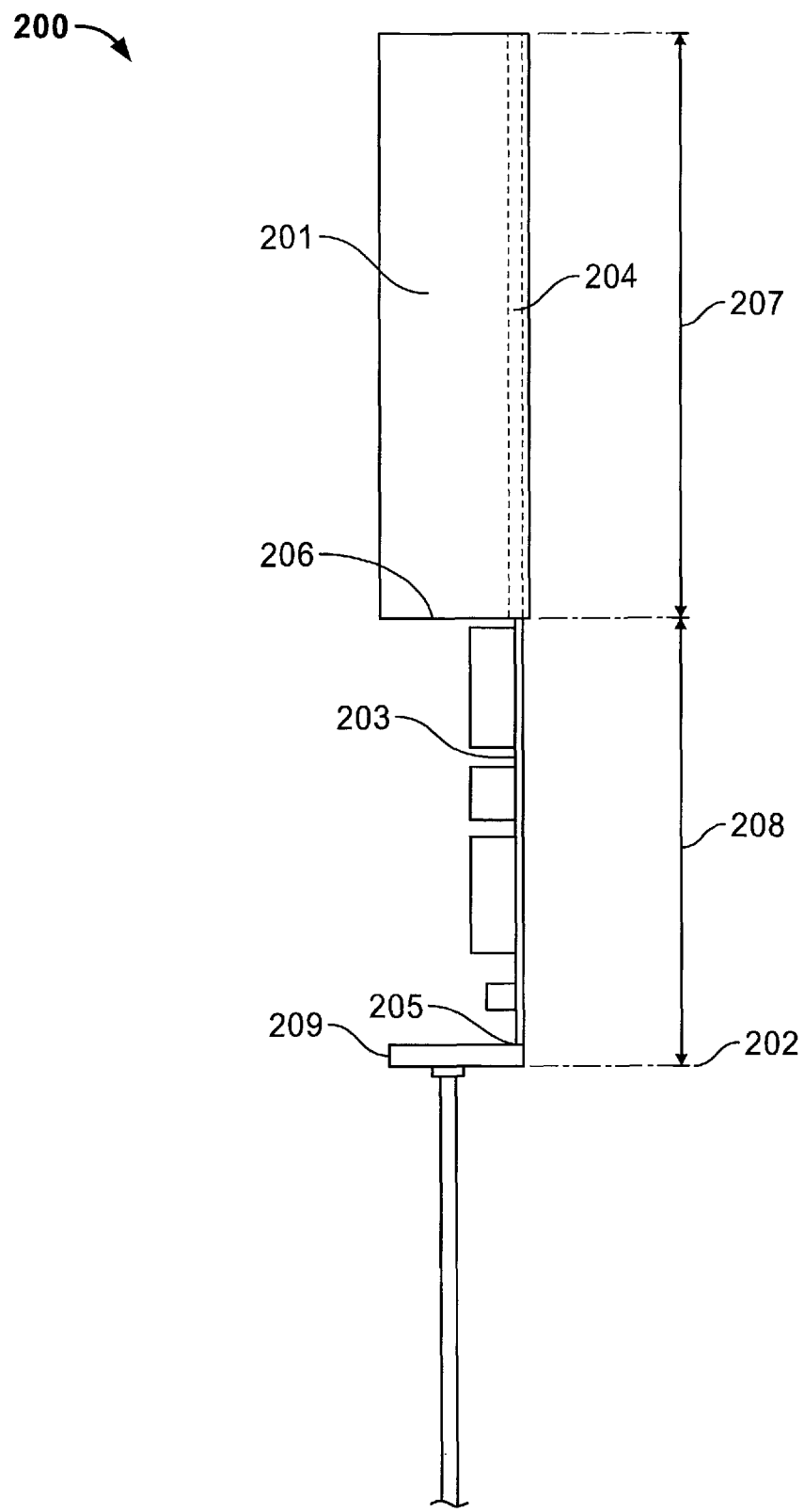
FIG. 2 is an exploded side view of an embodiment of an underground control enclosure.

FIG. 2 is a side view 200 of the apparatus for an underground control enclosure 201 in its fully extended and open position 202 showing one possible embodiment of a servicing availability position.

FIG. 2 is one embodiment of the underground control enclosure 201; open position 202 access is gained with the use of guides and bracketry 203, a telescoping rail with guide rack assembly 204, and a multi-sided tray panel 205 allowing the protected equipment to be withdrawn via and through the open bottom of the enclosure 206 in order for the electronic or electric components to be serviced. The sleeve and telescoping features facilitate the electronics tray to be withdrawn from the enclosure to a distance equal to the electronics tray length 207 plus an extra distance 208 equal to the length required to provide one and one-half atmospheric pressurization of the entrapped gas within the bubble. A gasketless water seal 209 prevents escape of pressurized gas and entry of liquid into the enclosure.

Figure 3:
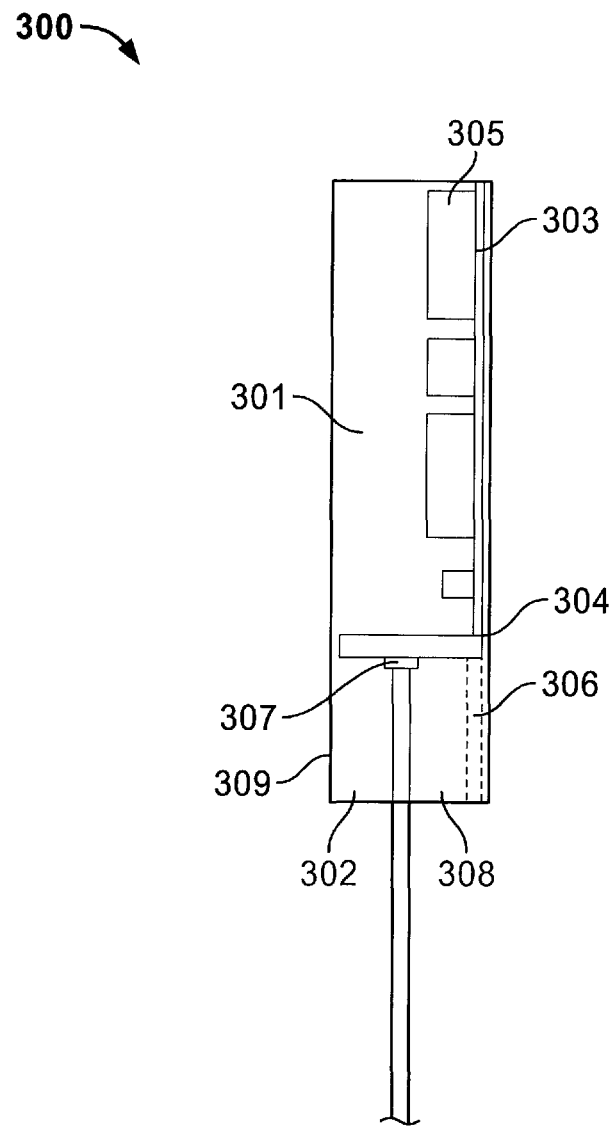
FIG. 3 is an exploded side view of an embodiment of the stored objects within an underground control enclosure.

FIG. 3 is an exploded side view 300 of the stored objects within the apparatus 300 for an underground control enclosure in its fully recessed and closed position 301 that provide security from tampering, vandalism and full water ingress prevention via the extra volume of air 302 entrapped below the protected tray 303 and surrounded by a skirt 309.

FIG. 3 shows one embodiment of the gasketless waterproof enclosure apparatus providing an enclosure that will prevent electronic and electrical equipment and other stored objects from being damaged by water when placed in locations below ground level to a depth of fifteen (15) feet. Note the water damage prevention does not rely on gaskets or other mechanical means. Rather, a retractable positioning system 304 allows for the protected equipment to be raised to a height within the enclosure to allow the entrapped gas 308 to be pressurized by a rising fluid, which will cease to rise within the bell when the pressure exerted on the entrapped gas within the bell becomes equal to the pressure of the rising liquid, thus, protecting the electronic or electric components or other stored objects fastened to the removable multi-sided tray 305. Thereby, utilizing a rack and rail system with nested guides 306 in the fully retracted position, and providing ingress for electrical conduits 307 as well as to prevent equipment damage from water breaching the enclosure.

The new waterproof enclosure utilizes the rising water to trap and pressurize a chamber of atmospheric pressure air which when compressed by the rising liquid to a maximum pressure equivalent to column height of fifteen feet of water, retains a gas chamber where the stored objects reside.

Further, the apparatus may provide a locking or latching entry feature allowing the protected equipment to be secured in place where access is gained through the open bottom of the enclosure.

Figure 4:
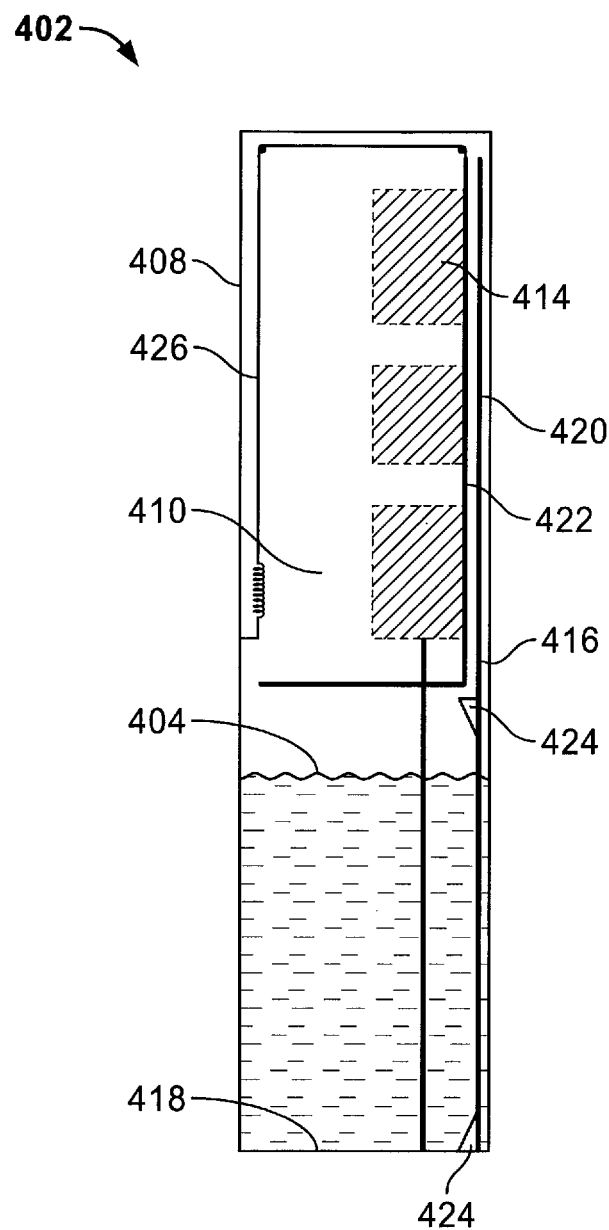
FIG. 4 is an exploded view of an embodiment of a gasketless waterproof enclosure apparatus.

FIG. 4 is a view of one embodiment of a gasketless waterproof enclosure apparatus 402 comprising a gasketless open bottom airtight enclosure 408. The apparatus 402 also includes a gasketless water seal 404 being the same size as an inner diameter of the open bottom airtight enclosure 408, thereby preventing fluid ingress into a pressurized gas area 410 and preventing air loss from said pressurized gas area 410. The pressurized gas area 410 comprises an interior of the open bottom air tight enclosure wherein electronic equipment or other stored objects 414 may be placed, wherein said open bottom air tight enclosure 408 allows liquid to push upward on said gasketless enclosure to a level wherein a total volume contained within said open bottom air tight enclosure comprises a volume of liquid below the gasketless enclosure plus a volume of gas inside the pressurized gas area 410, wherein an internal pressure of gas equals one and one-half atmospheres (1.5) and wherein an arrangement of electronic equipment components or other stored objects are located within the pressurized gas area 410 within the enclosure at a further height than an opening access cavity to create a pressure differential. Said pressure differential comprises a difference of fifteen feet of water over the bottom of an enclosure opening such that said pressure differential causes said liquid to push upwards within the open bottom air tight enclosure until the pressure of gas inside the pressurized gas area equals one and one half atmospheres. When the enclosure apparatus 402 is submerged in water, water rises from the opening in the bottom creating an interface between the water and the air trapped inside the enclosure. Because the enclosure 408 is airtight, the trapped air is compressed and pushes water down inside the enclosure. When the pressure of water pushing in reaches equilibrium with the air pressure pushing down, further water ingress into the enclosure is prevented, and the equipment 414 placed at an upper portion of the enclosure is protected from water damage. An embodiment of the waterproof enclosure is designed to withstand water pressure of one and one-half (1.5) atmosphere pressure ("ATM"), which is about the pressure from fifteen feet high of water. Those or ordinary skill in the art will realize that a variety of items, including electronic equipment, may be placed inside the gasketless waterproof enclosure.

In another aspect of the embodiment, the gasketless waterproof enclosure apparatus may further include a guide and bracketry inner chassis 416 providing a means for withdrawing protected equipment through an opening 418 at the bottom of the enclosure apparatus, a rail sleeve telescoping guide assembly 420, and a tray panel 422 that is slidingly coupled to the rail sleeve telescoping guide assembly 420, an open bottom pressure differential cavity, and a skirt 422 coupled to the gasketless enclosure.

In yet another aspect of the embodiment, the NautilUs Self Pressurizing Equipment Enclosure comprises a concealed locking or latching entry feature 424 allowing the protected equipment 414 to be secured in place where access is gained through the open bottom of the enclosure.

In a further aspect of the embodiment, the NautilUs Self Pressurizing Equipment Enclosure comprises a means for counterbalancing weight distribution 426 allowing the protected equipment 414 and submersible enclosure 402 to be of lesser weight while still providing the necessary pressure differential to seal the apparatus. The means for counterbalancing weight distribution 426 may be coupled to the rail sleeve telescoping assembly.

In another embodiment, a method for providing prevention of water ingress to a gasketless waterproof enclosure apparatus, comprises the steps of: gasketless water sealing to a depth of fifteen feet, waterproof enclosure and mounting, and protection of the stored objects from water damage.

Figure 5:
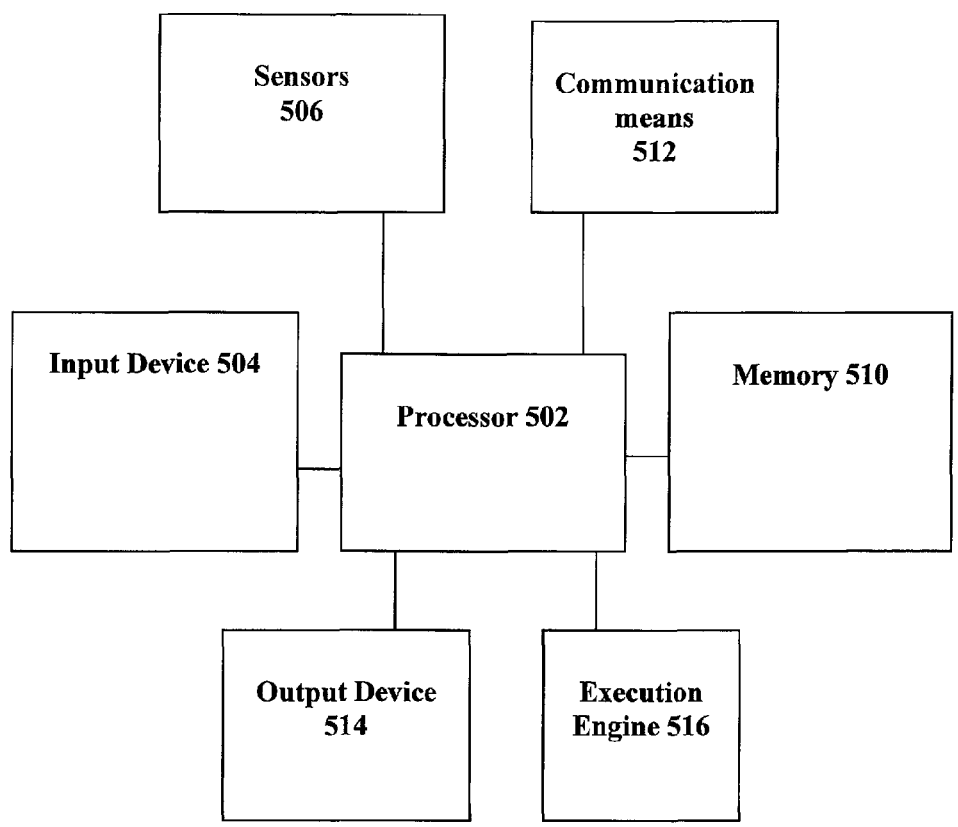
FIG. 5 is a block diagram of the monitoring system of an embodiment of NautilUs Self Pressurizing Equipment Enclosure.

In another embodiment as shown in FIG. 5, the NautilUs Self Pressurizing Equipment Enclosure includes a monitoring system 500 that comprises a processor 502 and one or more input devices 504 coupled to the processor 502. One or more sensors 506 are coupled to the processor 502 with the one or more sensors 506 being capable of detecting one or more user-defined parameters and generating one or more signals in response to the presence of the one or more user-defined parameters. A memory 510 is also coupled to the processor. The embodiment further comprises one or more wireless communications means 512, one or more output devices 514 and an execution engine 516 including a method for monitoring the status of one or more stored objects in a gasketless waterproof enclosure apparatus. The one or more sensors 506 may be located in a variety of positions within the enclosure. One of ordinary skill will realize the positions of the one or more sensors may vary depending on environmental needs or other considerations.

Figure 6A:
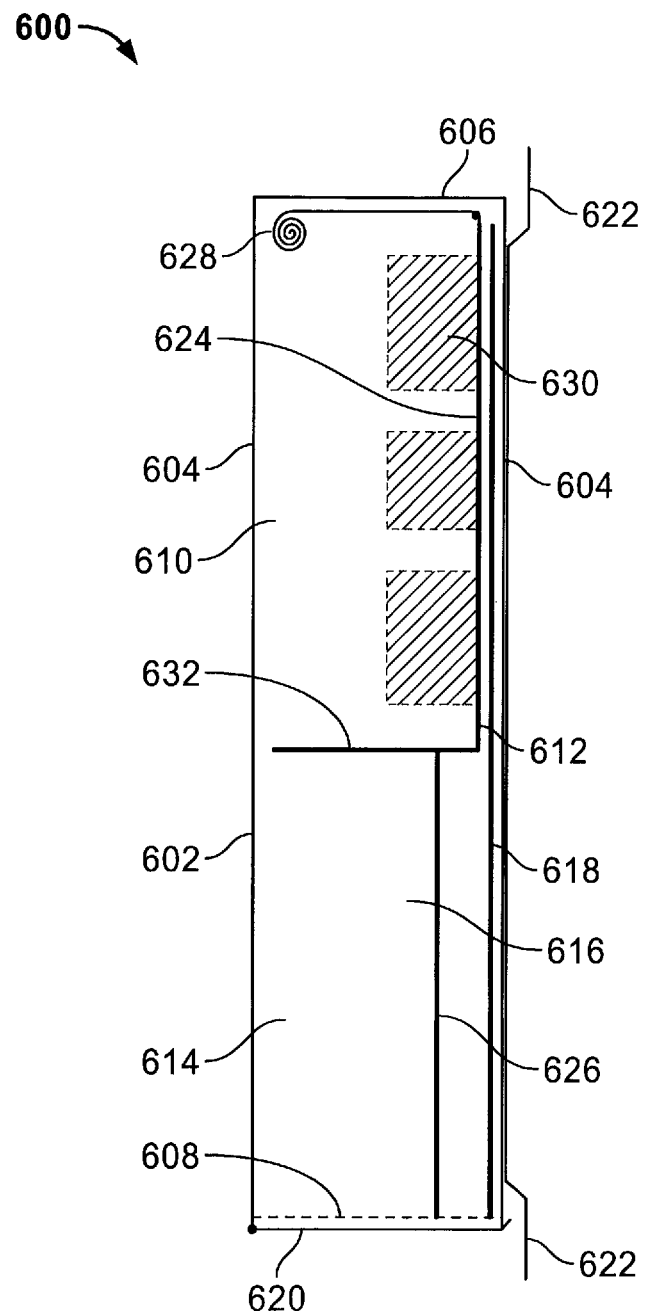
FIG. 6A is an exploded side view of an embodiment a waterproof enclosure apparatus.

FIG. 6A is a side view of an embodiment of a waterproof enclosure apparatus 600. The apparatus comprises a waterproof enclosure 602, said waterproof enclosure 602 being gas tight at its side wall 604 and top 606 and having an opening 608 at its bottom when said waterproof enclosure apparatus stands in an intended use orientation. The apparatus usually is intended to stand upright, but in some embodiments the apparatus may be designed to have a slanted shape to be used on a slope. An internal chassis 612 is designed for mounting stored object of the waterproof enclosure apparatus to an upper portion 610 inside said waterproof enclosure 602. It is within the scope of this invention that stored object of the enclosure apparatus encompasses any item, electronic or otherwise that one or more users wish to store in a liquid-free environment within the enclosure. A lower portion 614 of said waterproof enclosure apparatus 602 is adapted to be used as a pressure differential cavity. One of ordinary skill in the art will appreciate that the lower portion of the waterproof enclosure apparatus is adapted to be used as a pressure differential cavity and is not intended to hold stored object. In some embodiments the height of said waterproof enclosure 602 is longer than the widest width of said waterproof enclosure 602.

Figure 6B:
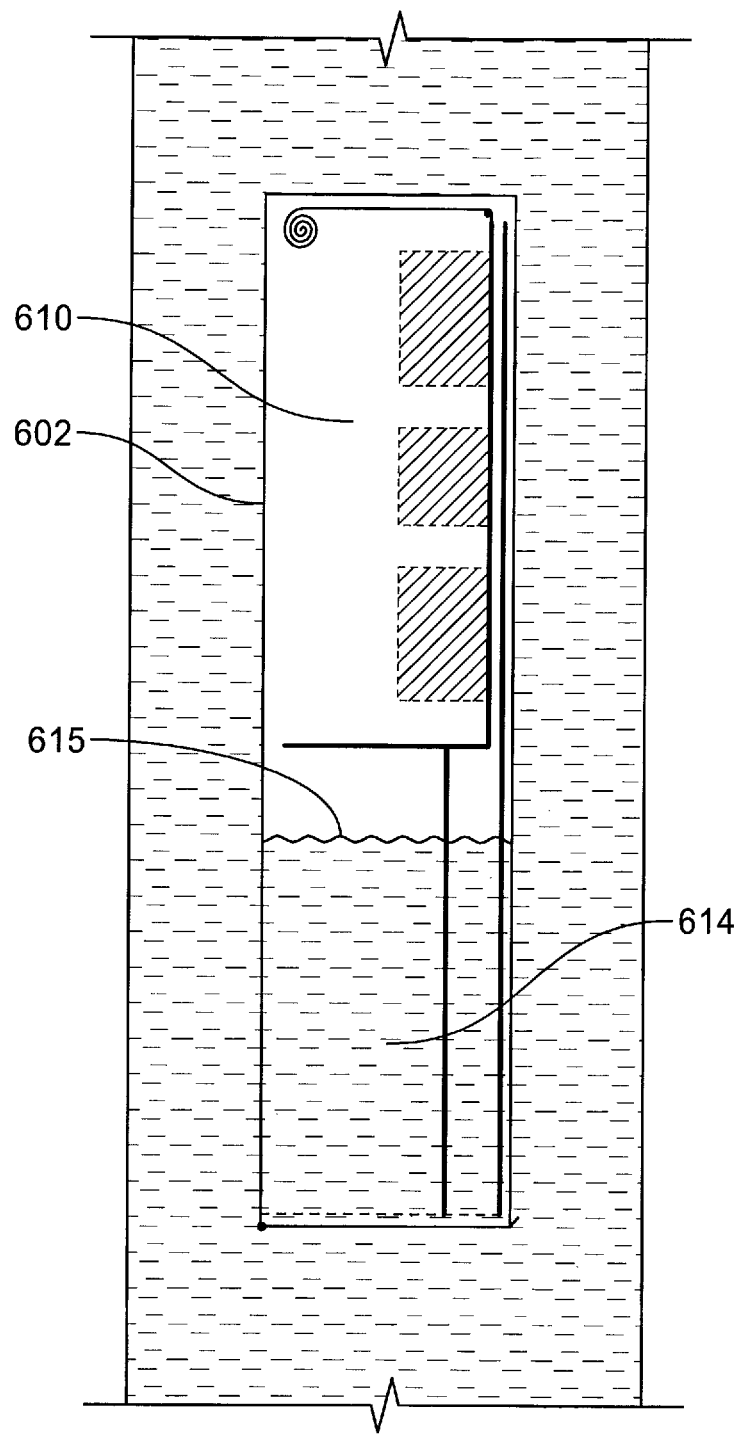
FIG. 6B depicts an embodiment of the waterproof enclosure apparatus submerged under water.

FIG. 6B depicts an embodiment of the waterproof enclosure apparatus submerged under water. With water ingresses through the bottom opening 608, the water displaces and pushes up a volume of air in the lower portion 614 of the waterproof enclosure 602 and forms a water-air interface 615 that is substantially level. The air in the remaining portion of the waterproof enclosure is compressed and exerts a pressure downward. The air pressure increases as more water ingresses and the air is displaced into a smaller volume. When the pressure of the air and the pressure of water reaches equilibrium, the water-air interface 615 stops moving upward. At the designed maximum pressure of 1.5 ATM, the interface 615 will remain below the upper portion 610, and stored objects in the upper portion 610 are protected from contacting water.

Figure 6C:
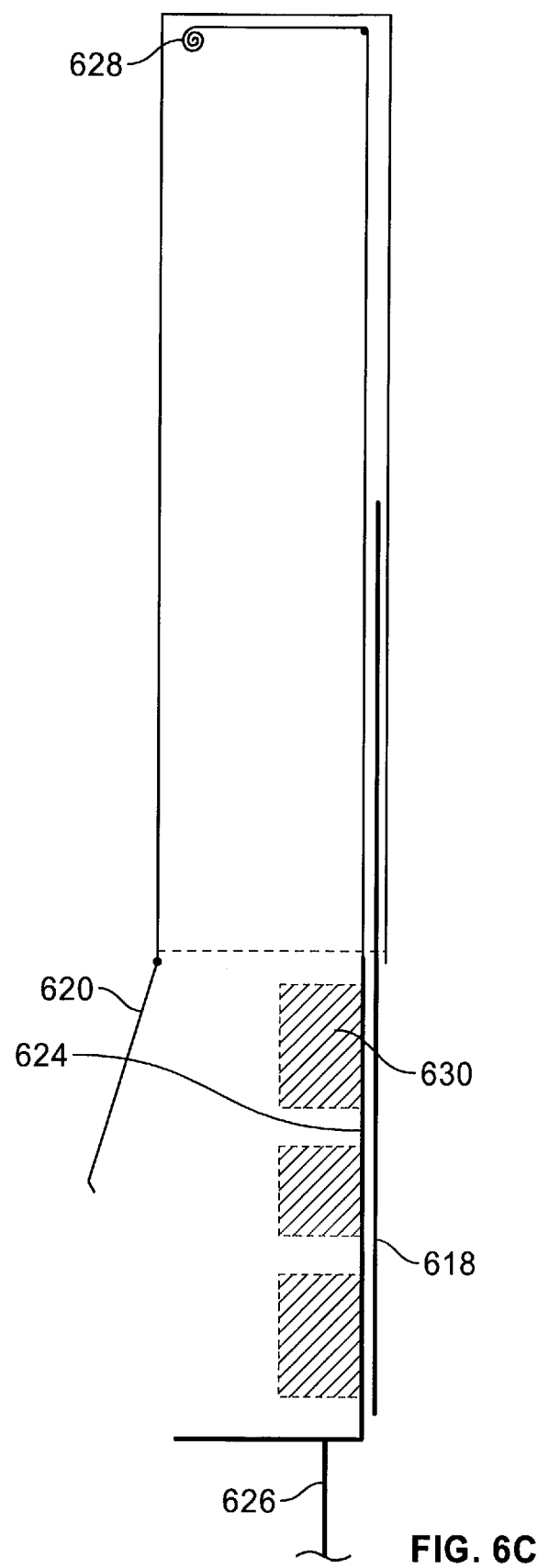
FIG. 6C shows an embodiment of a gasketless waterproof enclosure apparatus when the internal chassis is pulled out of the enclosure apparatus.

In another aspect of the embodiment, the internal chassis 612 may provide a means for withdrawing protected equipment through an opening 608 at the bottom of the enclosure apparatus. The internal chassis 612 may include guide and bracketry that uses a rail sleeve telescoping guide assembly 618, and a tray panel 624 that is slidingly coupled to the rail sleeve telescoping guide assembly 618. FIG. 6C shows the apparatus when the internal chassis is pulled out of the enclosure for easy access to the stored object 630. The rail sleeve telescoping guide assembly 618 may partially or substantially entirely slide out of the enclosure, and the tray panel 624 may slide on the guide assembly 618. To facilitate movement, a spring and pulley system 628 similar to one used on a sliding garage door may be employed to counterbalance the weight of the internal chassis 612 and the stored object 630. It is readily apparent to those skilled in the art that various methods of counterbalancing weight and facilitating movement of the tray panel 624 may be employed. The tray panel 624 may optionally include a bottom panel 632 and a pull string or rod 626.

In another aspect, as shown in FIG. 6C, the embodiment may further comprise a cover 620 that covers the opening at the bottom of the waterproof enclosure. It is to be understood by one of ordinary skill that the cover can be a hinged door, a sliding door, bolted on, snapped on or secured by using other means known in the art. The door may cover the whole opening or partially and may leave an opening for wires to go through. In yet other aspects, the embodiment may further comprise a fixture 622 for installing the waterproof enclosure apparatus to its intended installation site. Such fixtures 622 may be handles, rails or other means known in the art and may be located at various positions on the enclosure as required.

In yet other aspects of the embodiment, the waterproof enclosure apparatus 600 may further comprise electronic circuitry capable of communicating various parameters including temperature and humidity to a remote location. In some aspects, such electronic circuitry may be the same as the monitoring system 500 described in FIG. 5 and the associated text. In some other aspects, such electronic circuitry may include one or more dedicated sensors and electronic circuit. The sensors detect one or more user defined parameters such as temperature and humidity and generate one or more signals. The electronic circuit picks up the signals, processes the signals and transmits the processed signals to a remote location. The processed signal may be digital or analog. The transmission may be wired or wireless depending on the situation. In some instances, the processed signal may be transmitted in cooperation with the electronic equipment stored in the waterproof enclosure.

Figure 7:
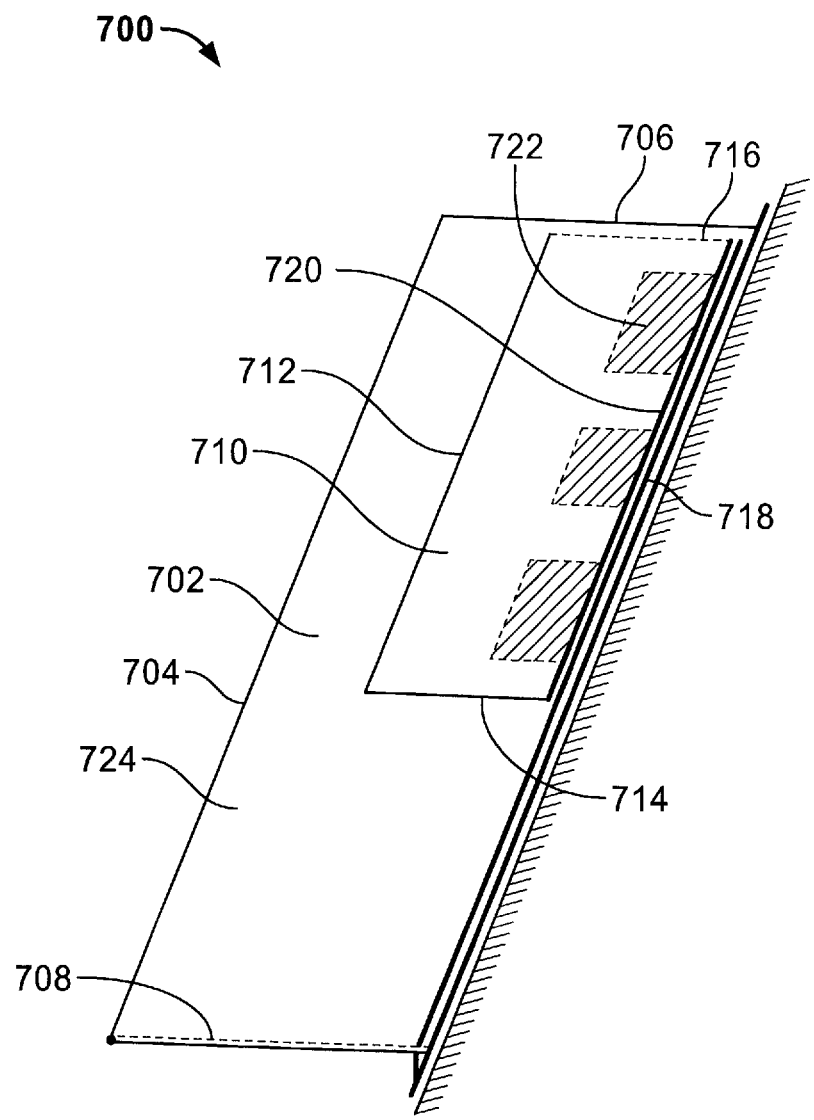
FIG. 7 is an exploded side view of an embodiment of a waterproof enclosure apparatus comprising an outer waterproof enclosure and an inner waterproof enclosure.

In another embodiment as shown in FIG. 7, a waterproof enclosure apparatus 700 comprises an outer waterproof enclosure 702, wherein said outer waterproof enclosure 702 being gas tight at its side wall 704 and top 706 and having an opening at its bottom 708 when said waterproof enclosure apparatus stands in its intended installation orientation. In many circumstances, the intended installation orientation is upright; however, FIG. 7 depicts a specially shaped embodiment of apparatus 700 that is adapted to be installed on a slope. An inner waterproof enclosure 710 is gastight at its side wall 712 and bottom 714 and has an opening 716 at its top. The inner waterproof enclosure 710 is attached to the outer waterproof enclosure 702 through an internal chassis 718. In a working configuration, the opening 716 of the inner enclosure 710 is close to the top 706 of the outer enclosure 702. The inner waterproof enclosure 710 may further include a structure (not shown) for holding one or more stored objects 722 in the waterproof enclosure apparatus. The pressure differential cavity 724 is of sufficient size so that the waterproof enclosure apparatus 700 will withstand a designed water pressure without water entering into the inner enclosure 710.

Figure 8:
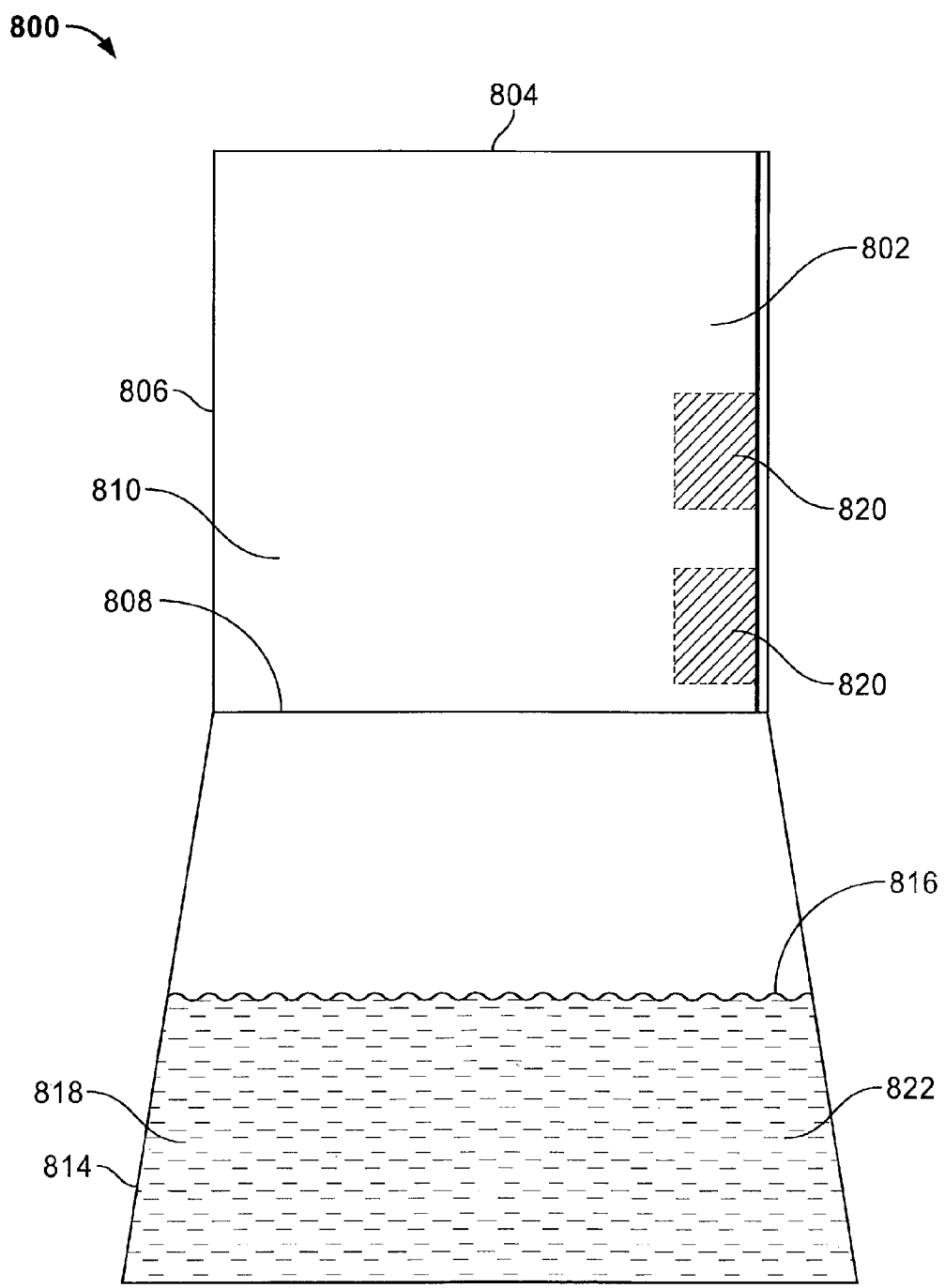
FIG. 8 is an exploded front perspective view of a gasketless waterproof enclosure apparatus.

In an embodiment as shown in FIG. 8, a gasketless waterproof enclosure apparatus 800 comprises an open bottom enclosure 802 including a sealed top 804, sides defined by one side wall 806 being in a substantially rectangular shape, and an open bottom 808. A first inner volume 810 is defined by defined by the side wall 806 and the sealed top 804. A skirt 814 is gas tightly coupled to the bottom of the side wall 806, thereby forming a second inner volume 818. The second inner volume 818 is smaller than the first inner volume 810. The skirt 814 is of a length sufficient to maintain a water proof environment inside first inner volume 810 up to 1.5 atmospheres of pressure. The open bottom enclosure 802 protects one or more stored objects 820 located inside the first inner volume 810 and wherein upon submersion of the open bottom enclosure 802 into a liquid 822 the liquid 822 rises upward within said second inner volume 818 but does not rise upward into said first inner volume 810, wherein said liquid 822 rising upward forming a liquid-gas interface 816 and pressurizing gas located in said first inner volume 810 to a maximum pressure of one and one half atmospheres (1.5 atm), the final pressure of the gas located in said first inner volume 810 being equal to the pressure of liquid 822 pushing upward on said gas, thereby achieving a state of equilibrium. As the liquid 822 stops rising, one or more stored objects 820 located in the inner volume 810 remain free from unwanted exposure to the liquid 822. The composition of the liquid that the apparatus is immersed in may vary based on environmental factors. For example, certain environments may have a very alkaline or acidic liquid environment. Other environments may have liquids that are corrosive or otherwise damaging. It is within the scope of this invention that different materials may be used to construct the enclosure such that it may be adapted to be used in differing and potentially harsh liquid environments.

Figure 9A:
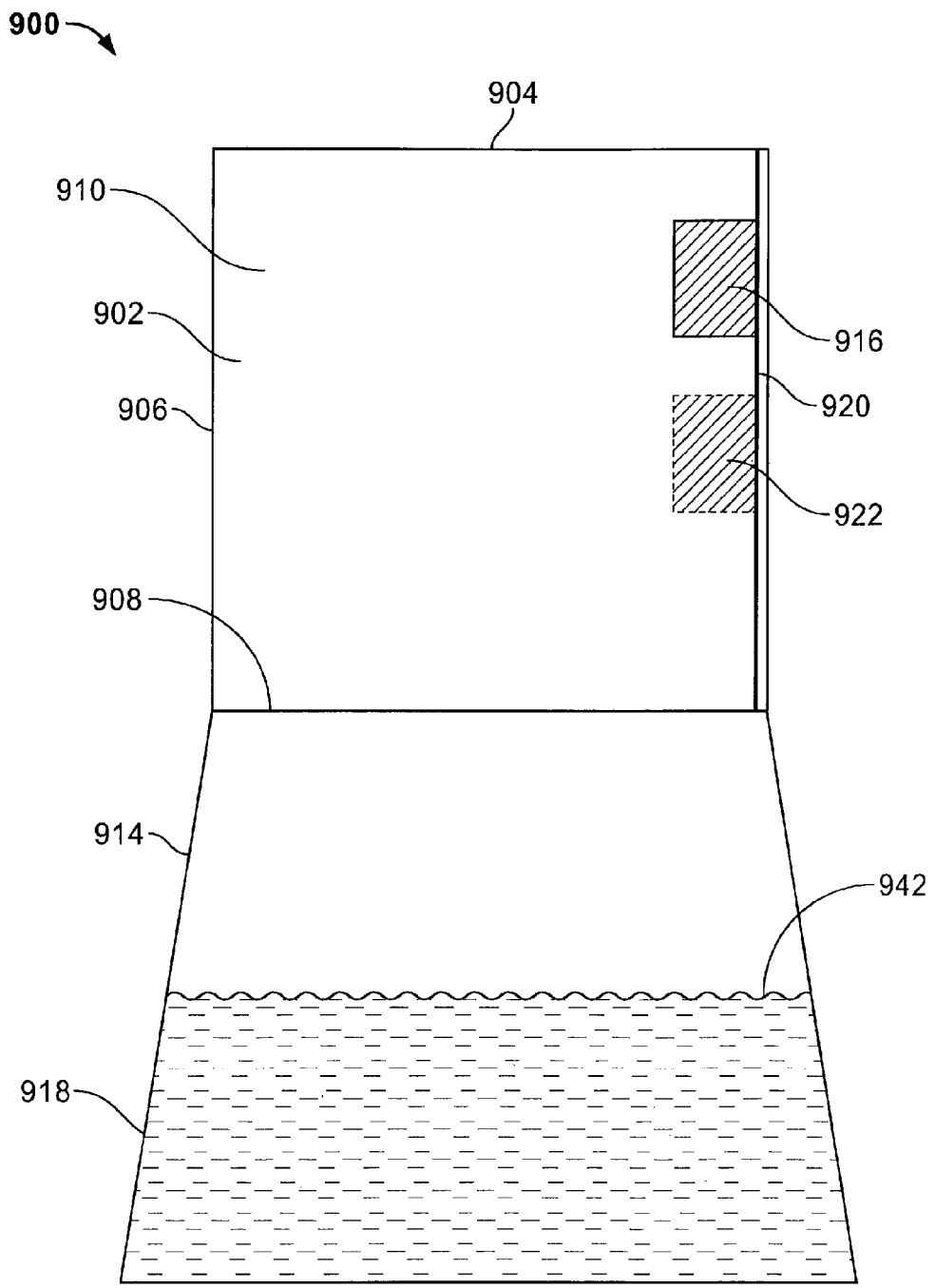
FIG. 9A is an exploded front view of a gasketless waterproof enclosure apparatus including an electronics monitoring system.
Figure 9B:
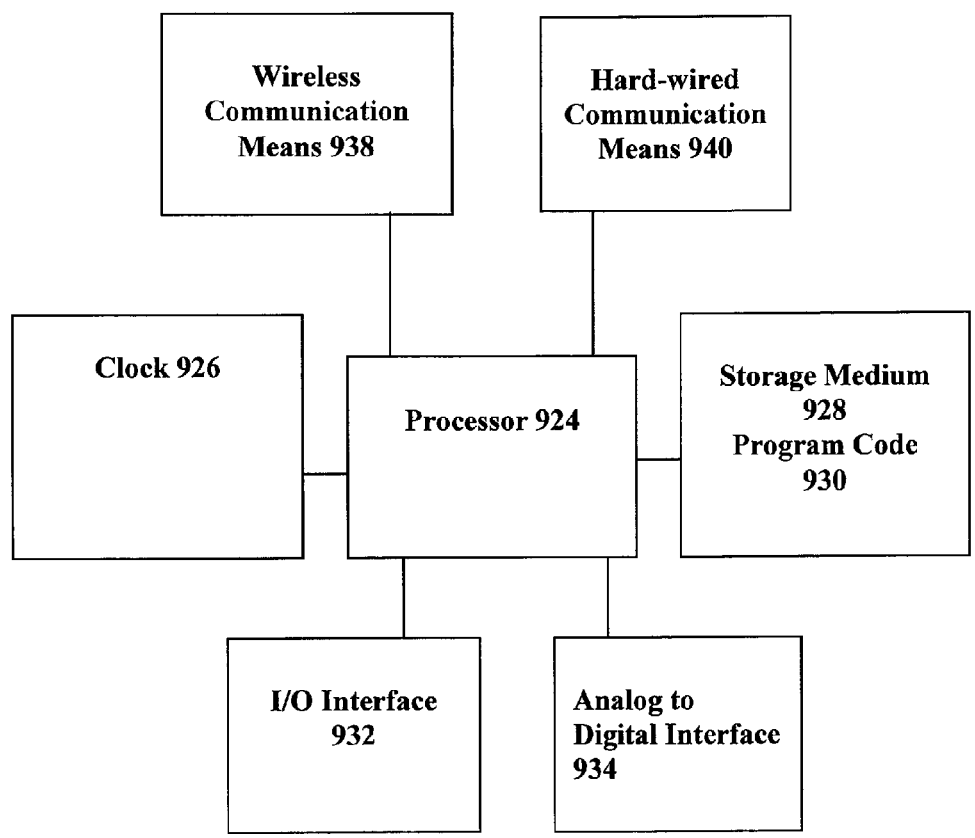
FIG. 9B is a block diagram of a monitoring electronic circuit in a gasketless waterproof enclosure apparatus.

In an embodiment as shown in FIG. 9A, a gasketless waterproof system 900 comprises: an open bottom enclosure 902 comprising a sealed top 904, sides 906 defined by one side wall being in a substantially rectangular shape, and an open bottom 908, wherein a first inner volume 910 is defined by said open bottom enclosure 902; a skirt 914 coupled to the bottom edge of sides 906, thereby forming a second inner volume 918, the second inner volume 918 being smaller than the first inner volume 910; one or more mounting means 920 inside said inner portion 912 of the open bottom enclosure, wherein one or more stored objects 922 can be mechanically coupled to the one or more mounting means 920; and an electronic circuit 916. As illustrated in FIG. 9B, the electronic circuit 916 comprises one or more processors 924; one or more clocks 926 coupled to the one or more processors 924; one or more computer-usable readable storage medium 928 having computer-readable program code 930 embodied therein, wherein the one or more computer-usable readable storage medium 928 is coupled to the one or more processors 924; one or more I/O interfaces 932; one or more analog to digital interfaces 934; one or more operating system software environments; one or more wireless communication means 938; and one or more hard-wired communication means 940. The open bottom enclosure 902 protects one or more stored objects 922 located inside the first inner volume 910. Upon submersion of the open bottom enclosure 902 into a liquid 942, the liquid 942 rises upward within said second inner volume 918 and pressurizes gases located in said first inner volume 910 to a maximum pressure of one and one half atmospheres (1.5 atm), the final pressure of the gases located in said first inner volume 910 being equal to the pressure of liquid 942 pushing upward on said gases, thereby achieving a state of equilibrium. Thus, the liquid 942 does not rise upward into said first inner volume 910. It is understood by one of ordinary skill that the one or more mounting means can be any commonly used or known in the art such as (but not limited to) screws, shelves, bins, mounting racks, bolts, glue, tape or other suitable mounting means.

Figure 10:
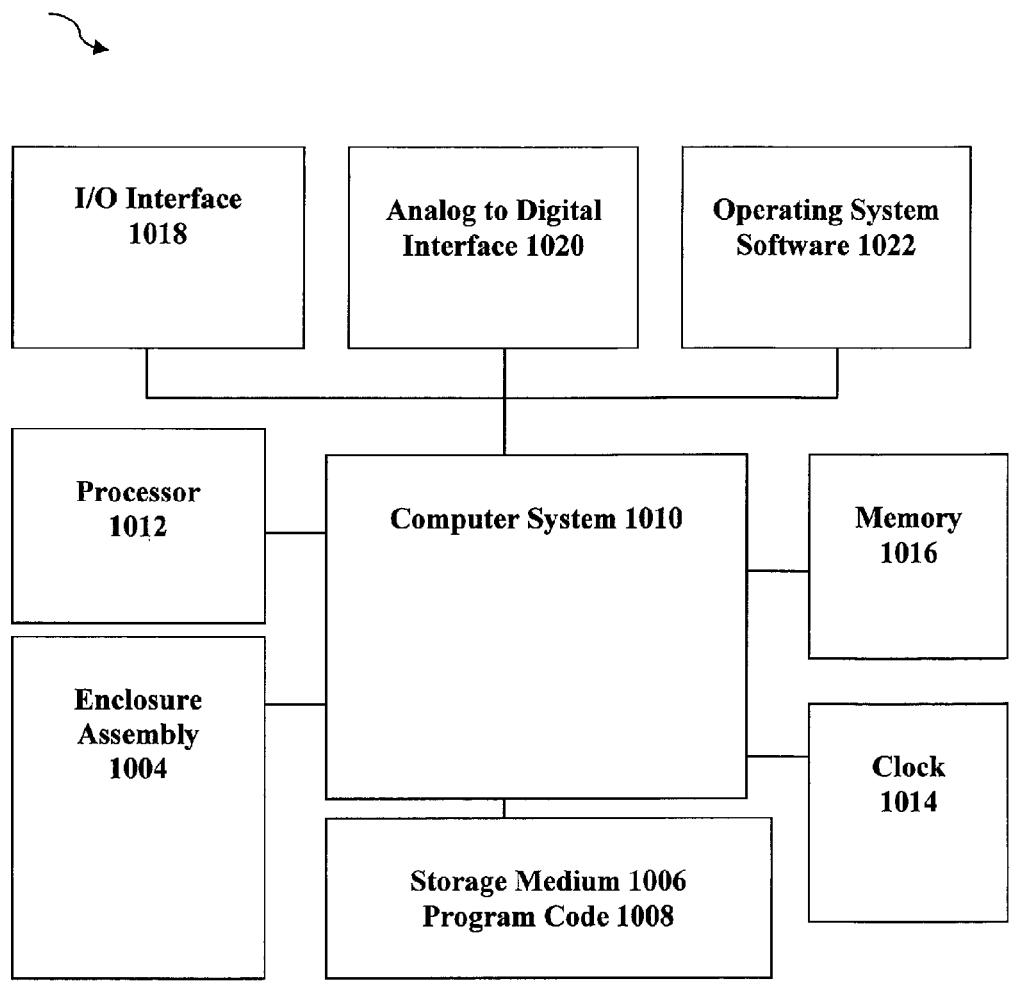
FIG. 10 is a block diagram of a system for monitoring the status of a gasketless waterproof enclosure apparatus.

In an embodiment as shown in FIG. 10, a system 1000 to provide a computer implemented method for monitoring the status of one or more stored objects in a gasketless waterproof enclosure apparatus 1004 and for monitoring the status of the enclosure apparatus 1004 including computer-usable readable storage medium 1006 having computer-readable program code 1008 embodied therein for causing a computer system 1010 to perform a method of monitoring the status of one or more stored objects in an gasketless, waterproof enclosure apparatus 1004 in an application platform comprises: one or more processors 1012; a clock 1014; memory 1016; one or more I/O interfaces 1018; one or more analog to digital interfaces 1020; operating system software 1022; and the gasketless waterproof enclosure apparatus 1004. The waterproof enclosure apparatus 1004 can be any of the waterproof gasketless apparatuses described herein including 100, 201, 300, 402, 600, 700, and 800 that can protect object stored therein from contacting water when the enclosure apparatus 1004 is submerged under water.

Figure 11A:
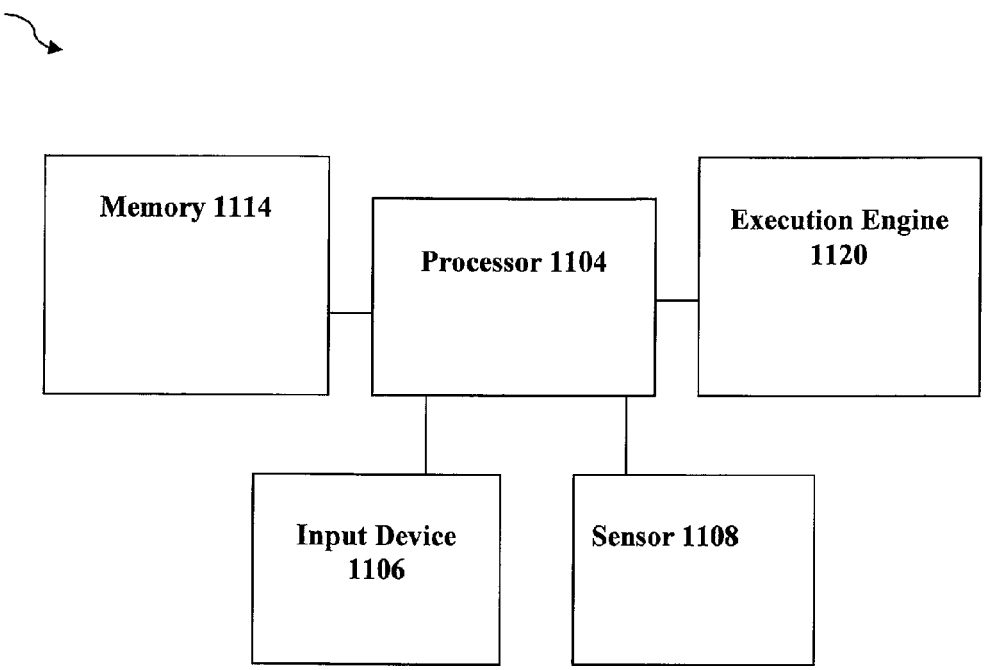
FIG. 11 is a block diagram of a computer implemented apparatus 1100 for providing a method for monitoring the status of one or more stored objects in a gasketless waterproof enclosure apparatus.
Figure 11B:
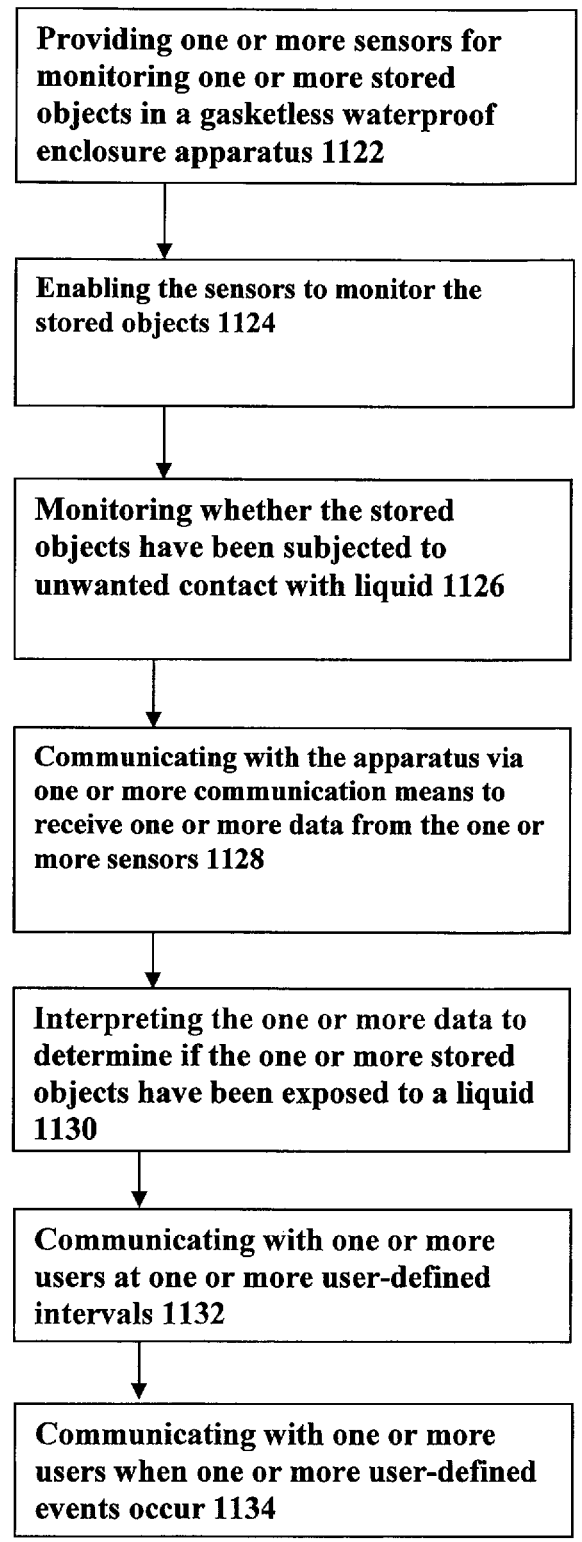

In another embodiment as shown in FIG. 11, a computer implemented apparatus 1100 for providing a method for monitoring the status of one or more stored objects in a gasketless waterproof enclosure apparatus comprises: a processor 1104; an input device 1106 coupled to said processor 1104; a sensor 1108 coupled to the processor 1104, the sensor 1108 being capable of detecting one or more user-defined parameters and in response generating one or more signals; a memory 1114 coupled to said processor 1104; a communications means 1116; an output device 1118; and an execution engine 1120. The execution engine 1120 for performing a method for monitoring the status of one or more stored objects in a gasketless waterproof enclosure apparatus comprises the following steps: providing one or more sensors for monitoring one or more stored objects in a gasketless waterproof enclosure apparatus comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment in side first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means 1122; enabling the one or more sensors coupled to the processor to monitor whether the one or more stored objects has been subjected to unwanted contact with liquid 1124; monitoring whether the one or more stored objects has been subjected to unwanted contact with liquid with the one or more sensors 1126; communicating with said apparatus via one or more communication means to receive one or more data from the one or more sensors 1128; interpreting the one or more data to determine if the one or more stored objects have been exposed to a liquid 1130; communicating with one or more users at one or more user-defined intervals 1132; and communicating with one or more users when one or more user-defined events occur 1134.

Figure 12:
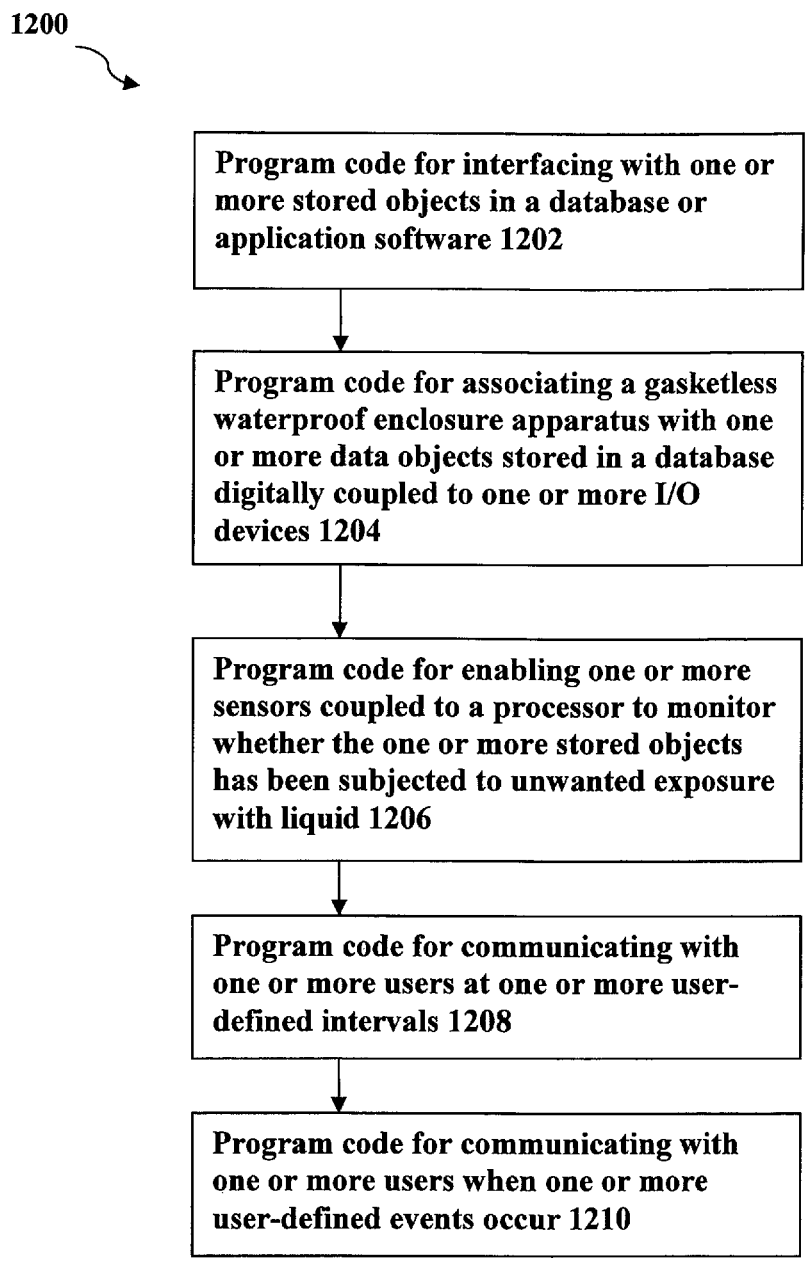
FIG. 12 is a block diagram of a computer readable medium for monitoring the status of one or more stored objects in a gasketless waterproof enclosure apparatus.

In yet another embodiment as shown in FIG. 12 a computer readable medium for monitoring the status of one or more stored objects in a gasketless waterproof enclosure apparatus 1200, comprising: program code for interfacing 1202 with one or more stored objects in a database or application software, communicably coupled to one or more I/O devices in a gasketless waterproof enclosure apparatus that is capable of isolating the electronic components and other stored objects in a sealed top portion from an open bottom portion, wherein said gasketless waterproof enclosure comprises a first inner volume that is defined by a volume formed by an inner portion of said open bottom enclosure, a skirt coupled to the bottom portion of said open bottom enclosure, and thereby forming a second inner volume, the second inner volume being less than the first inner volume and wherein said skirt is of a length sufficient to maintain a water proof environment in side first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects in a database or application software, communicably coupled to one or more I/O devices and can be mechanically and communicably coupled to the one or more mounting means; program code for associating 1204 a gasketless waterproof enclosure apparatus with one or more data objects stored in a database digitally coupled to one or more I/O devices that are located within an upper portion of the gasketless waterproof enclosure apparatus; program code for enabling 1206 one or more sensors coupled to a processor to monitor whether the one or more stored objects has been subjected to unwanted exposure with liquid; program code for communicating 1208 with one or more users at one or more user-defined intervals; and program code for communicating 1210 with one or more users when one or more user-defined events occur.

In an embodiment of a method for preventing a stored object from unwanted exposure to liquid, a gasketless waterproof enclosure apparatus is provided. The apparatus includes a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment in side first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means. The stored object is placed in an upper portion inside said gasketless waterproof enclosure apparatus. The gasketless waterproof enclosure apparatus is installed in a user defined location.

In another embodiment, a method is provided for monitoring a gasketless waterproof enclosure apparatus. The method includes the following steps: providing a gasketless waterproof enclosure apparatus where in the apparatus includes a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment in side first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means; in an upper portion inside said gasketless waterproof enclosure apparatus, providing a processor, an input device coupled to said processor, an output device coupled to said processor, and a communications means coupled to said output device; providing a sensor coupled to said input device, said sensor being capable of detecting a user-defined parameter and generate a signal in response to said user-defined parameter.

In an aspect of the embodiment, the method entails adapting the sensor to detect an environmental parameter of the waterproof enclosure apparatus is detected. The environment parameter may be temperature, pressure, humidity or other parameters as desired by a user. The environment parameter may be a parameter outside of the enclosure apparatus, at a lower portion inside the enclosure apparatus, or at an upper portion inside the enclosure apparatus. In another aspect of the embodiment, the method entails adapting the sensor to detect a user defined parameter of a stored object that is placed in an upper portion inside the waterproof enclosure apparatus.

In a further aspect of the embodiment, the following steps may be performed: placing a stored object in the upper portion inside the waterproof enclosure apparatus; installing said waterproof enclosure apparatus containing said stored object in a user defined location; enabling said sensor to detect said user-defined parameter; and communicating said signal generated by said sensor to a user. The stored object may be electronic components or other water sensitive objects that a user seeks to deploy in a location that may be flooded.

Figure 13:
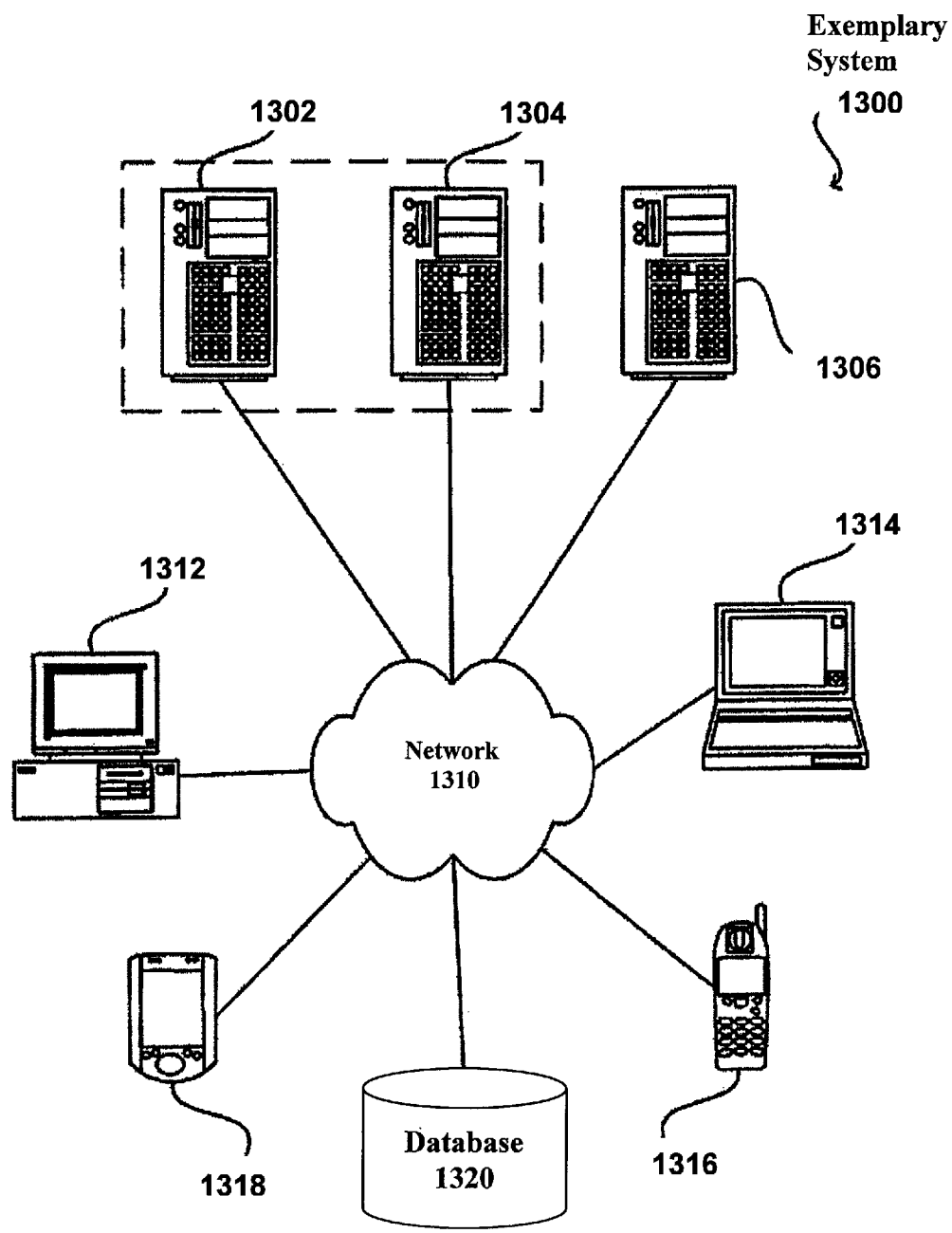
FIG. 13 is an illustration depicting an exemplary operating environment including one or more user computers, computing devices, or processing devices, which can be used to operate a client, such as a dedicated application, web browser is shown.

FIG. 13 is a block diagram illustrating components of an exemplary operating environment in which embodiments of the present invention may be implemented. The system 1300 can include one or more user computers, computing devices, or processing devices 1312, 1314, 1316, 1318, which can be used to operate a client, such as a dedicated application, web browser, etc. The user computers 1312, 1314, 1316, 1318 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1312, 1314, 1316, 1318 may also have any of a variety of applications, including one or more development systems, database client and/or server applications, and Web browser applications. Alternatively, the user computers 1312, 1314, 1316, 1318 may be any other electronic device, such as a thin-client computer, Internet-enabled gaming system, and/or personal messaging device, capable of communicating via a network (e.g., the network 1310 described below) and/or displaying and navigating Web pages or other types of electronic documents. Although the exemplary system 1300 is shown with four user computers, any number of user computers may be supported.

In most embodiments, the system 1300 includes some type of network 1310. The network can be any type of network familiar to those skilled in the art that can support data communications using any of a variety of commercially-available protocols, including without limitation TCP/IP, SNA, LPX, AppleTalk, and the like. Merely by way of example, the network 1310 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UNITS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1302, 1304, 1306 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1306) may be dedicated to running applications, such as a business application, a Web server, application server, etc. Such servers may be used to process requests from user computers 1312, 1314, 1316, 1318. The applications can also include any number of applications for controlling access to resources of the servers 1302, 1304, 1306.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1312, 1314, 1316, 1318. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1312, 1314, 1316, 1318.

The system 1300 may also include one or more databases 1320. The database(s) 1320 may reside in a variety of locations. By way of example, a database 1320 may reside on a storage medium local to (and/or resident in) one or more of the computers 1302, 1304, 1306, 1312, 1314, 1316, 1318. Alternatively, it may be remote from any or all of the computers 1302, 1304, 1306, 1312, 1314, 1316, 1318, and/or in communication (e.g., via the network 1310) with one or more of these. In a particular set of embodiments, the database 1320 may reside in a storage-area network ("SAN") familiar to those skilled in the art. Similarly, any necessary files for performing the functions attributed to the computers 1302, 1304, 1306, 1312, 1314, 1316, 1318 may be stored locally on the respective computer and/or remotely, as appropriate. In one set of embodiments, the database 1320 may be a relational database, such as Oracle 10g, that is adapted to store, update, and retrieve data in response to SQL-formatted commands.

Figure 14:
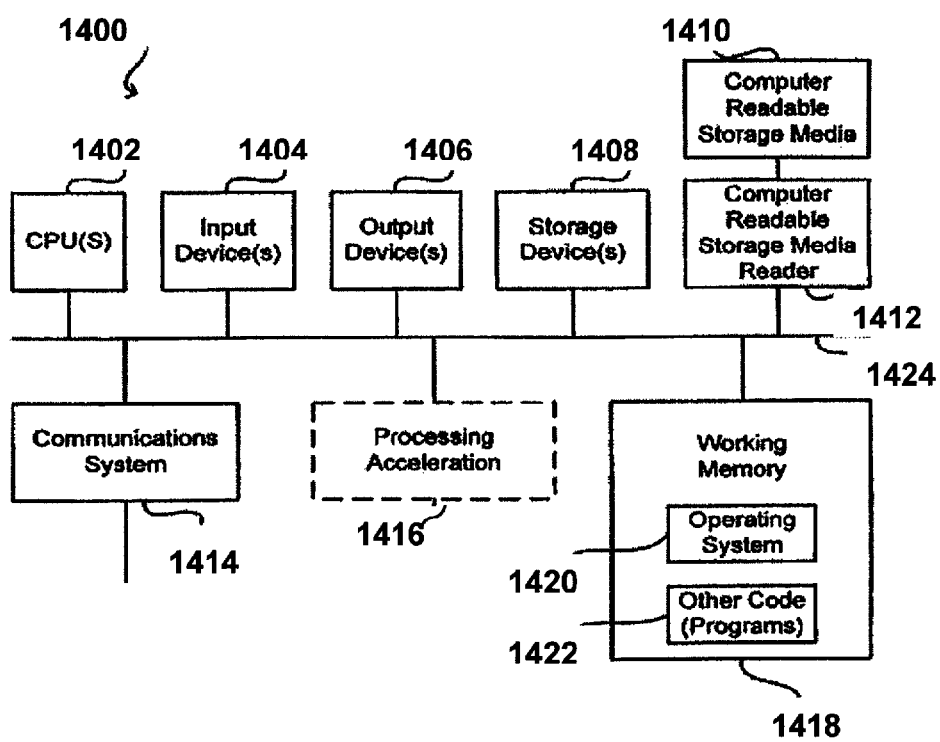
FIG. 14 is another illustration depicting an exemplary operating environment including a computer system with various elements as shown.

FIG. 14 illustrates an exemplary computer system 1400, in which embodiments of the present invention may be implemented. The system 1400 may be used to implement any of the computer systems described above. The computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). The computer system 1400 may also include one or more storage devices 1408. By way of example, the storage device(s) 1408 can include devices such as disk drives, optical storage devices, solid-state storage device such as a random access memory ("RAM") and/or a read-only memory ("ROM"), which can be programmable, flash-updateable and/or the like.

The computer system 1400 may additionally include a computer-readable storage media reader 1412, a communications system 1414 (e.g., a modem, a network card (wireless or wired), an infra-red communication device, etc.), and working memory 1418, which may include RAM and ROM devices as described above. In some embodiments, the computer system 1400 may also include a processing acceleration unit 1416, which can include a digital signal processor DSP, a special-purpose processor, and/or the like.

The computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing, storing, transmitting, and retrieving computer-readable information. The communications system 1414 may permit data to be exchanged with the network and/or any other computer described above with respect to the system 1400.

The computer system 1400 may also comprise software elements, shown as being currently located within a working memory 1418, including an operating system 1420 and/or other code 1422, such as an application program (which may be a client application, Web browser, mid-tier application, RDBMS, etc.). It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 14 further illustrates an environment where an on-demand distributed database service might be used. As illustrated in FIG. 14 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users accesses the on-demand database service via user systems, or third party application developers access the on-demand database service via user systems.

The security of a particular user system might be entirely determined by permissions (permission levels) for the current user. For example, where a user account identification transaction may involve a portable identification alpha-numeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of the plurality of servers has access to at least one third party entity system data schema; however, other alternative configurations are contemplated.

According to one arrangement, each user system and all of its components are operator configurable using applications, such as a browser, including computer code run using a central processing unit such as an Intel Pentium® processor or the like. Similarly, a computer system (and additional instances of an enterprise database, where more than one is present) and all of their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

In this disclosure, the terms "water" and "liquid" generally refer to any liquid including water, rain water, flood water, sewage, sea water, oil, sludge, and liquid that may be alkaline, acidic, corrosive, or otherwise damaging the stored object in the enclosure apparatus.

The above illustrations provide many different embodiments for implementing different features of the invention. Specific embodiments of waterproof enclosure apparatus and processes are described to help clarify the invention. These are, of course, merely embodiments and are not intended to limit the invention from that described in the claims.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A gasketless waterproof enclosure apparatus, comprising:
an open bottom air tight enclosure with a gasketless enclosure attached thereto, said gasketless enclosure comprising:
a gasketless water seal being the same size as an inner diameter of the open bottom air tight enclosure, thereby preventing fluid ingress into a pressurized gas area and preventing air loss from said pressurized gas area
wherein said pressurized gas area comprises an interior of the open bottom air tight enclosure wherein stored objects may be placed, and further wherein said open bottom air tight enclosure allows liquids to push upward on said gasketless enclosure to a level wherein a total volume contained within said open bottom air tight enclosure comprises a volume of liquid below the gasketless enclosure plus a volume of gas inside the pressurized gas area;
wherein an arrangement of stored objects are located within the pressurized gas area within the enclosure at a height greater in magnitude than an opening access cavity to create a pressure differential
wherein said pressure differential comprises a difference of fifteen feet of water over the bottom of an enclosure opening such that said pressure differential causes said liquids to push upwards within the open bottom air tight enclosure until the pressure of gas inside the pressurized gas area equals one and one half atmospheres;
a processor;
one or more input devices coupled to said processor;
one or more sensors coupled to the input devices, the one or more sensors being capable of detecting one or more user-defined parameters and generating one or more signals corresponding to a magnitude of the one or more user-defined parameters;
a memory coupled to said processor;
one or more wireless communications means coupled to the processor;
one or more output devices coupled to the processor; and
an execution engine for executing a method for monitoring the status of one or more stored objects in a gasketless waterproof enclosure apparatus comprising the steps of:
enabling the one or more sensors to monitor the one or more stored objects;
monitoring with the one or more sensors whether the one or more stored objects have been subjected to unwanted contact with liquid;
communicating with the apparatus via one or more communication means to receive one or more data from the one or more sensors;
interpreting the one or more data to determine if the one or more stored objects have been exposed to a liquid;
communicating with one or more users at one or more user-defined intervals; and
communicating with one or more users when one or more user-defined events occur.

2. The apparatus of claim 1, further comprising:
a guide and bracketry inner chassis providing a means for withdrawing protected equipment through an open bottom of said open bottom air tight enclosure;
a rail sleeve telescoping guide assembly;
a component mounting rear tray panel that is slidingly coupled to the rail sleeve telescoping guide assembly;
an open bottom pressure differential cavity; and
and a skirt coupled to the gasketless enclosure, wherein said skirt allows fluid to push upward on said gasketless enclosure.

3. The apparatus of claim 1, further comprising:
a submersible chassis assembly wherein a guide and bracketry inner chassis portion, a rail sleeve telescoping guide assembly;
a component mounting rear tray panel that is slidingly coupled to the rail sleeve telescoping guide assembly;
an open bottom pressure differential cavity;
and a skirt coupled to the gasketless enclosure;
wherein a gasketless water seal protects the stored objects up to a maximum water column height of fifteen feet over the bottom of the open enclosure bottom; and
wherein said maximum water column height creates a pressure differential that causes liquid to push upwards within the open bottom air tight enclosure until the pressure of gas inside the pressurized gas area equals one and one half atmospheres.

4. The apparatus of claim 2 wherein:
an open bottom air tight cavity comprises:
a liquid volume fluidly coupled to a gas volume creating a gas-fluid coupling layer;
wherein said gas-fluid coupling layer interface rises in elevation within said open bottom air tight cavity thereby changing the internal pressure of gas so as to be equal to a rising compressed liquid pressure to a maximum design pressure of 1.5 atmospheres; and
thereby preventing liquid exposure to said stored objects to a maximum design depth of 15 feet of water below surface level and equivalent to a column height of 15 feet of water over the bottom of an open enclosure bell bottom, independent of the enclosure's distance below surface grade.

5. The apparatus of claim 2, further comprising:
one or more guides and bracketry allowing the protected equipment to be withdrawn via and through the open bottom of the air tight enclosure in order for the stored objects to be serviced, a telescoping rail and guide rack assembly, and a five sided tray panel.

6. The apparatus of claim 3 wherein said guides and bracketry include sleeve and telescoping features to facilitate full height 150% extension thereby utilizing a rack and rail system with nested guides in a fully retracted position and wherein said guides and bracketry are strong enough to allow the stored objects mounted to the tray panel to extend to 150% of the length of said tray panel.

7. The apparatus of claim 1 wherein the stored objects are secured in place and wherein access to the stored objects is gained through the open bottom of the enclosure.

8. The apparatus of claim 4, further comprising:
a means for counterbalancing weight distribution of the stored objects plus the tray panel thereby providing the necessary pressure differential to seal the apparatus, said means for counterbalancing weight distribution coupled to said rail sleeve telescoping guide assembly.

9. A waterproof enclosure apparatus adapted to be installed in a substantially upright position, comprising:
a waterproof enclosure, said waterproof enclosure being gas tight at its side and top and having opening at its bottom when said waterproof enclosure apparatus stands upright;
means for placing stored object of the waterproof enclosure apparatus to an upper portion inside said waterproof enclosure;

wherein a lower portion of said waterproof enclosure apparatus is adapted to be used as a pressure differential cavity; and wherein the height of said waterproof enclosure is longer than the widest width of said waterproof enclosure.

10. The waterproof enclosure apparatus of claim 9, wherein said means for placing stored object of the enclosure to an upper portion inside said waterproof enclosure, comprising:
a guide and bracketry inner chassis;
a rail sleeve telescoping guide assembly; and
a tray panel that is slidingly coupled to the rail sleeve telescoping guide assembly.

11. The waterproof enclosure apparatus of claim 9, wherein said means for placing stored object of the enclosure to an upper portion inside said waterproof enclosure, comprising:
a submersible chassis assembly comprising a guide and bracketry inner chassis portion, a rail sleeve telescoping guide assembly; and
a tray panel that is slidingly coupled to the rail sleeve telescoping guide assembly.

12. The waterproof enclosure of claim 9, further comprising:
a processor;
one or more input devices coupled to said processor;
one or more sensors coupled to the processor, the one or more sensors being capable of detecting one or more user-defined parameters and generating one or more signals in response to the presence of the one or more user-defined parameters;
a memory coupled to said processor;
one or more wireless communications means;
one or more output devices; and
an execution engine including a method for monitoring the status of one or more stored objects in a gasketless waterproof enclosure apparatus comprising the following steps:
placing one or more stored objects in an open bottom enclosure comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment inside first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means;
enabling the one or more sensors coupled to the processor to monitor whether the one or more stored objects has been subjected to unwanted contact with liquid;
monitoring whether the one or more stored objects has been subjected to unwanted contact with liquid with the one or more sensors;
communicating with said apparatus via one or more wireless communication means to receive one or more data from the one or more sensors;
interpreting the one or more data to determine if the one or more stored objects have been exposed to a liquid;
communicating with one or more users at one or more user-defined intervals; and
communicating with one or more users when one or more user-defined events occur.

13. The waterproof enclosure apparatus of claim 10 wherein said guides and bracketry include sleeve and telescoping features to facilitate full height 150% extension thereby utilizing a rack and rail assembly with nested guides in a fully retracted position.

14. The waterproof enclosure apparatus of claim 10, further comprising:
a means for counterbalancing weight distribution of the stored objects plus the tray panel thereby providing the necessary pressure differential to seal the apparatus, said means for counterbalancing weight distribution coupled to said rail sleeve telescoping guide assembly.

15. The waterproof enclosure apparatus of claim 9, further comprising:
one or more bottom covers that cover said opening at the bottom of said waterproof enclosure apparatus.

16. The waterproof enclosure apparatus of claim 9, further comprising:
means for installing said waterproof enclosure apparatus to its intended installation site.

17. The waterproof enclosure apparatus of claim 9, further comprising:
one or more sensors capable of detecting one or more parameters and generating one or more signals; and
one or more electronic circuitry capable of transmitting said signals to a remote location.

18. A waterproof enclosure apparatus, comprising:
an outer waterproof enclosure, wherein said outer waterproof enclosure being gas tight at its side and top and having opening substantially only at its bottom when said waterproof enclosure apparatus is in an intended installation orientation;
inner waterproof enclosure, wherein said inner waterproof enclosure being gas tight at its side and bottom and having opening substantially only at its top when said waterproof enclosure apparatus is in said intended installation orientation;
wherein through attachment means, said inner waterproof enclosure being attached inside said outer waterproof enclosure, said opening of the inner enclosure being close to the top of the outer enclosure; and
means for holding stored object of the waterproof enclosure apparatus inside said inner waterproof enclosure.

19. A gasketless waterproof enclosure apparatus, comprising:
an open bottom air tight enclosure comprising a sealed top portion, sides defined by one side wall being in a substantially rectangular shape, and an open bottom portion, wherein a first inner volume is defined by the volume formed by an inner portion of said open bottom enclosure;
a skirt coupled to the bottom portion of said open bottom enclosure, thereby forming a second inner volume, the second inner volume being less than the first inner volume;
wherein said skirt is of a length sufficient to maintain a water proof environment inside first inner volume up to 1.5 atmospheres of pressure, therefore forming an air tight open bottom enclosure with a gasketless water seal;
wherein said open bottom enclosure protects one or more stored objects located inside the first inner volume and wherein upon submersion of the open bottom enclosure into a liquid the liquid rises upward within said second inner volume but does not rise upward into said first inner volume, wherein said liquid rising upward pressurizes gases located in said first inner volume to a maximum pressure of one and one half atmospheres (1.5 atm), the final pressure of the gases located in said first inner volume being equal to the pressure of liquid pushing upward on said gases, thereby achieving a state of equilibrium; and wherein said state of equilibrium provides a gasketless water seal such that said one or more stored objects located in said inner volume remain free from unwanted exposure to a liquid.

20. The gasketless waterproof enclosure apparatus of claim 19, further comprising:
a guide and bracketry inner chassis coupled to the inner portion of said open bottom enclosure and wherein the guide and bracketry inner chasis provides a means for withdrawing protected equipment through an open bottom of said open bottom air tight enclosure;
a rail sleeve telescoping guide assembly coupled to said guide and bracketry inner chassis;
a tray panel that is slidingly coupled to the rail sleeve telescoping guide assembly; and
an open bottom pressure differential cavity comprising second inner volume formed by said skirt.

21. The gasketless waterproof enclosure apparatus of claim 19, further comprising:
a submersible chassis assembly including a guide and bracketry inner chassis portion, a rail sleeve telescoping guide assembly;
a tray panel that is slidingly coupled to the rail sleeve telescoping guide assembly;
an open bottom pressure differential cavity;
wherein a gasketless water seal protects said stored objects up to a maximum water column height of fifteen feet over the bottom of the open enclosure bottom; and
wherein said maximum water column height creates a pressure differential that causes liquid to push upwards within the open bottom air tight enclosure until the pressure of gas inside the pressurized gas area equals one and one half atmospheres.

22. The gasketless waterproof enclosure apparatus of claim 19 wherein said open bottom enclosure is comprised of material selected from the group consisting of metal, aluminum, fiberglass, metal composite, plastic, and plastic composite.

23. A gasketless waterproof enclosure system, comprising:
an open bottom enclosure comprising a sealed top portion, sides defined by one side wall being in a substantially rectangular shape, and an open bottom portion, wherein a first inner volume is defined by a volume formed by an inner portion of said open bottom enclosure;
a skirt coupled to the bottom portion of said open bottom enclosure, thereby forming a second inner volume, the second inner volume being less than the first inner volume;
one or more mounting means coupled to said inner portion of the open bottom enclosure, wherein one or more stored objects can be mechanically coupled to the one or more mounting means;
one or more processors;
one or more clocks coupled to the one or more processors;
one or more computer-usable readable storage medium having computer-readable program code embodied therein, wherein the one or more computer-usable readable storage medium is coupled to the one or more processors;
one or more I/O interfaces;
one or more analog to digital interfaces;
one or more operating system software environments;
one or more wireless communication means;
one or more hard-wired communication means; and
wherein said open bottom enclosure protects one or more stored objects located inside the first inner volume and wherein upon submersion of the open bottom enclosure into a liquid the liquid rises upward within said second inner volume but does not rise upward into said first inner volume, wherein said liquid rising upward pressurizes gases located in said first inner volume to a maximum pressure of one and one half atmospheres (1.5 atm), the final pressure of the gases located in said first inner volume being equal to the pressure of liquid pushing upward on said gases, thereby achieving a state of equilibrium.

24. The gasketless waterproof enclosure system of claim 23, wherein said skirt is of a length sufficient to maintain a water proof environment in side first inner volume up to 1.5 atmospheres of pressure, therefore forming an air tight open bottom enclosure with a gasketless water seal.

25. A system to provide a computer implemented method for monitoring the status of one or more stored objects in a gasketless waterproof enclosure apparatus including computer-usable readable storage medium having computer-readable program code embodied therein for causing a computer system to perform a method of monitoring the status of one or more stored objects in said gasketless waterproof enclosure system in an application platform, comprising;
one or more processors;
a clock;
memory;
one or more I/O interfaces;
one or more analog to digital interfaces;
operating system software;
a gasketless waterproof enclosure apparatus, including an outer waterproof enclosure, wherein said outer waterproof enclosure being gas tight at its side and top and having opening substantially only at its bottom when said waterproof enclosure apparatus is in an intended installation orientation, wherein the outer waterproof enclosure is an open bottom enclosure comprising a sealed top portion, sides defined by one side wall being in a substantially rectangular shape, and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume, one or more mounting means coupled to said inner portion of the open bottom enclosure, wherein one or more stored objects can be mechanically coupled to the one or more mounting means, and an inner waterproof enclosure, wherein said inner waterproof enclosure being gas tight at its side and bottom and having opening substantially only at its top when said waterproof enclosure apparatus is in said intended installation orientation, wherein through attachment means, said inner waterproof enclosure being attached inside said outer waterproof enclosure, said opening of the inner enclosure being close to the top of the outer enclosure, wherein said open bottom enclosure protects one or more stored objects located inside the first inner volume and wherein upon submersion of the open bottom enclosure into a liquid the liquid rises upward within said second inner volume but does not rise upward into said first inner volume, wherein said liquid rising upward pressurizes gases located in said first inner volume to a maximum pressure of one and one half atmospheres (1.5 atm), the final pressure of the gases located in said first inner volume being equal to the pressure of liquid pushing upward on said gases, thereby achieving a state of equilibrium;

a submersible chassis assembly including a guide and bracketry inner chassis portion;

a rail sleeve telescoping guide assembly;

a component mounting rear tray panel that is slidingly coupled to the rail sleeve telescoping guide assembly;

an open bottom pressure differential cavity;

a skirt coupled to the gasketless enclosure, wherein a gasketless water seal protects the stored objects up to a maximum water column height of fifteen feet over the bottom of the open enclosure bottom, and wherein said maximum water column height creates a pressure differential that causes liquid to push upwards within the gasketless enclosure until the pressure of gas inside the pressurized gas area equals one and one half atmospheres; and means for holding stored object of the waterproof enclosure apparatus inside said inner waterproof enclosure.

26. The system of claim 25, wherein said skirt is of a length sufficient to maintain a water proof environment in-side first inner volume up to 1.5 atmospheres of pressure.

27. A computer implemented apparatus for providing a method for preventing one or more stored objects in a gasketless waterproof enclosure apparatus from coming into contact with water, comprising:

a processor;

one or more input devices coupled to said processor;

one or more sensors coupled to the processor, the one or more sensors being capable of detecting one or more user-defined parameters and generated one or more signals in response to the presence of the one or more user-defined parameters;

a memory coupled to said processor;

one or more wireless communications means;

one or more output devices; and an execution engine including a method for monitoring the status of one or more stored objects in a gasketless waterproof enclosure apparatus comprising the following steps:

placing one or more stored objects in an open bottom enclosure comprising a sealed top portion and an open bottom portion, wherein a first inner volume is defined by a volume formed by an inner portion of said open bottom enclosure, a skirt coupled to the bottom portion of said open bottom enclosure, thereby forming a second inner volume, the second inner volume being less than the first inner volume and wherein said skirt is of a length sufficient to maintain a water proof environment inside first inner volume up to 1.5 atmospheres of pressure, therefore forming an air tight open bottom enclosure with a gasketless water seal and wherein one or more mounting means are coupled to said inner portion of the open bottom enclosure, wherein one or more stored objects can be mechanically coupled to the one or more mounting means;

enabling the one or more sensors coupled to the processor to monitor whether the one or more stored objects has been subjected to unwanted contact with liquid;

monitoring whether the one or more stored objects has been subjected to unwanted contact with liquid with the one or more sensors;

communicating with said apparatus via one or more wireless communication means to receive one or more data from the one or more sensors;

interpreting the one or more data to determine if the one or more stored objects have been exposed to a liquid;

communicating with one or more users at one or more user-defined intervals; and communicating with one or more users when one or more user-defined events occur.

* * * * *